(12) United States Patent
Kokubo et al.

(10) Patent No.: US 7,026,775 B2
(45) Date of Patent: Apr. 11, 2006

(54) METHOD AND APPARATUS FOR CONTROLLING SPEED OF MOVING BODY

(75) Inventors: Masatoshi Kokubo, Aichi-ken (JP); Shigeki Akiyama, Ichinomiya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/320,512

(22) Filed: Dec. 17, 2002

(65) Prior Publication Data

US 2003/0128002 A1   Jul. 10, 2003

(30) Foreign Application Priority Data

Dec. 20, 2001  (JP) ............... 2001-387758
Dec. 20, 2001  (JP) ............... 2001-387760

(51) Int. Cl.
    *H02P 1/00*   (2006.01)
(52) U.S. Cl. ............ 318/268; 318/276; 318/461; 318/609; 318/610; 388/811
(58) Field of Classification Search ........... 318/268, 318/276, 277, 278, 461, 609, 610; 388/800, 388/801, 811, 809
See application file for complete search history.

(56) References Cited

U.S. PATENT DOCUMENTS

| | | | | |
|---|---|---|---|---|
| 3,863,118 A | * | 1/1975 | Lander et al. ............... 318/685 |
| 4,490,796 A | * | 12/1984 | Bigbie et al. ............... 358/1.14 |
| 4,899,234 A | | 2/1990 | Genheimer | |
| 5,285,330 A | * | 2/1994 | Masaki ..................... 360/78.14 |
| 5,748,206 A | * | 5/1998 | Yamane ....................... 347/37 |
| 5,808,431 A | * | 9/1998 | Koyama et al. ............ 318/278 |
| 6,528,962 B1 | * | 3/2003 | Igarashi et al. ............ 318/461 |
| 6,619,778 B1 | * | 9/2003 | Igarashi ..................... 347/19 |

FOREIGN PATENT DOCUMENTS

| | | |
|---|---|---|
| JP | A-63-59781 | 3/1988 |
| JP | A-1-263977 | 10/1989 |
| JP | A-3-207283 | 9/1991 |
| JP | 5-22978 | 1/1993 |
| JP | 5-80856 | 4/1993 |
| JP | 6-131001 | 5/1994 |
| JP | 7-104861 | 4/1995 |
| JP | A-2002-307770 | 10/2002 |

* cited by examiner

Primary Examiner—Rina Duda
(74) Attorney, Agent, or Firm—Oliff & Berridge, PLC

(57) ABSTRACT

Method and apparatus for controlling a moving speed of a moving body, wherein at least one transient target speed value in addition to a final target speed value is used to control the moving speed in an accelerating period between a moment of initiation of a movement of the moving body and a moment at which the moving speed should coincide with the final target speed value. The transient target speed is updated at a predetermined timing, or changed to the final target speed value, or from one transient value to another transient value before it is changed to the final target speed value, so that the moving speed is smoothly increased to the final target speed value, without an overshoot beyond the final target speed value.

42 Claims, 18 Drawing Sheets

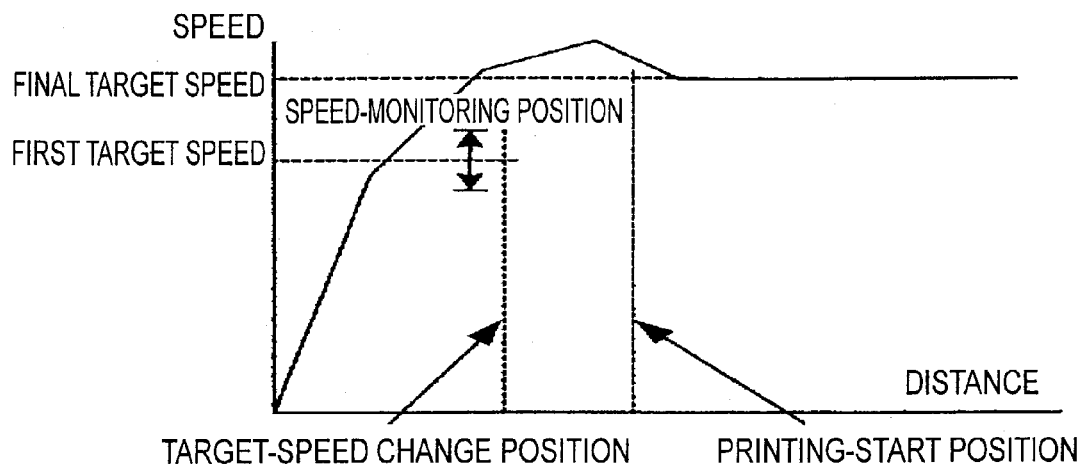
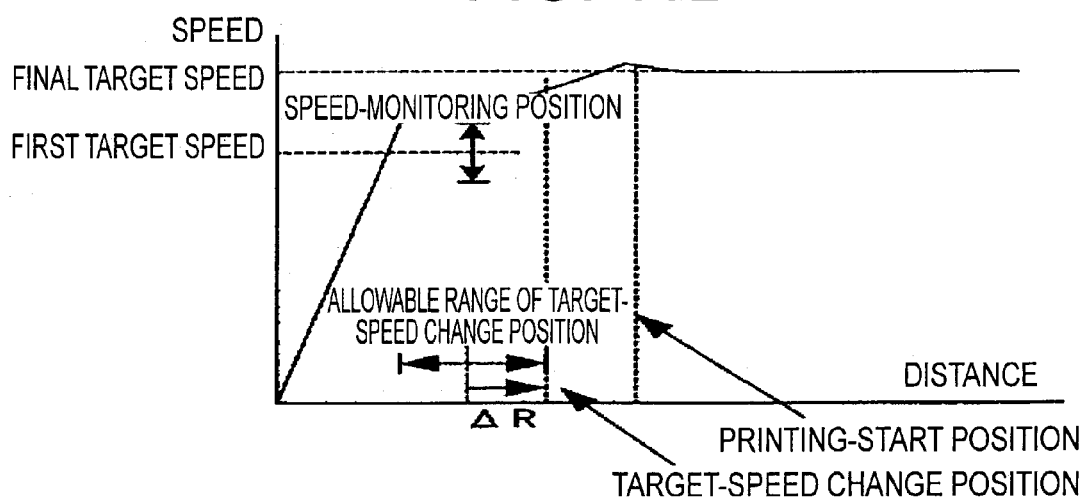
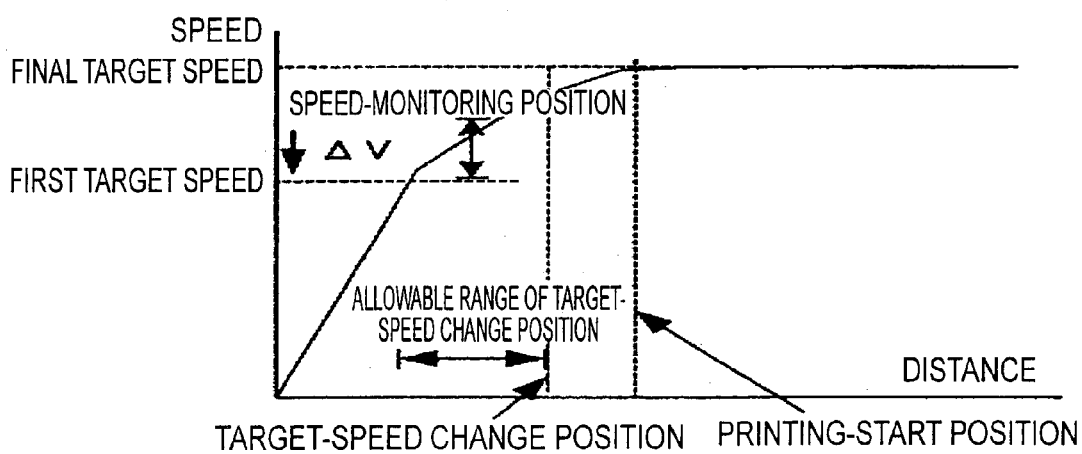

METHOD AND APPARATUS FOR CONTROLLING SPEED OF MOVING BODY

The present application is based on Japanese Patent Application Nos. 2001-387758 and 2001-387760 both filed Dec. 20, 2001, the content of which is incorporated herein by reference.

BACKGROUND OF THE INVENTION

1. Field of the Invention

The present invention relates to method and apparatus for controlling a moving speed of a moving body.

2. Discussion of Related Art

In a conventional ink-jet printer or any other conventional printer of a type wherein printing is effected on a sheet of paper while a printing head is moved, a moving speed of a carriage which carries the printing head is controlled to assure accurate positioning of a printed image.

Generally, the ink-jet printer uses a DC motor for driving the carriage. To control the moving speed of the carriage, the operating speed the DC motor (hereinafter referred to as "CR motor") is controlled by a voltage signal (hereinafter referred to as "PWM signal") which is regulated by pulse width modulation (PWM).

When a printing operation is initiated, the carriage is accelerated from the present position, that is, from a zero position or movement-start position to a printing-start position, as indicated in FIG. 18A, so that the moving speed of the carriage is raised to a predetermined desired or target value when the carriage reaches the printing-start position. During the following movement of the carriage from the printing-start position, the moving speed of the carriage is controlled to be held constant at the target speed.

In an accelerating region between the zero position and the printing-start position, the moving speed of the CR motor is controlled in an open-loop manner, so as to gradually rise, by gradually increasing the duty ratio of the PWM signal, which is a ratio of the ON time to the period of the signal (a sum of the ON and OFF times).

When the carriage has reached the printing-start position, the mode of control of the operating speed of the CR motor is changed from the open-loop control to a feedback control (PID control) in which the operating speed of the CR motor is controlled so as to eliminate or zero a speed control error between the actual moving speed and the target value of the carriage.

Recently, there has been a requirement for shortening the length of the accelerating region, that is, the distance of the accelerating movement of the carriage, in order to meet a need of reducing the size of the printer. To permit a rise of the moving speed of the carriage to the target value within the relatively short accelerating region, the duty ratio of the PWM signal must be increased at a high rate in the open-loop control of the operating speed of the CR motor. This high rate of increase of the duty ratio may cause a risk of a considerable amount of overshoot of the moving speed of the carriage, namely, an undesirable rise of the moving speed beyond the target value, before the carriage has reached the printing-start position, as indicated in FIG. 18B. If the feedback control of the operating speed of the CR motor is initiated following the open-loop control which has caused a considerable amount of overshoot of the moving speed of the carriage beyond the target value, the moving speed of the carriage suffers from a vibration or oscillation in an initial portion of a constant-speed region (printing region) following the accelerating region. It takes some time until the vibration has been fully attenuated, that is, until the moving speed of the carriage can be controlled to coincide with the target value. Accordingly, there is a risk that the actual printing position deviates from the nominal printing position in the initial portion of the constant-speed or printing region.

The amount of overshoot of the moving speed of the carriage tends to be large, particularly when the weight of the printing head is made small as a result of consumption of an ink accommodated in the printing head. In this case, it takes a considerably long time until the moving speed of the carriage coincides with the target value, leading to a risk of considerable deterioration of the printing performance of the ink-jet printer.

SUMMARY OF THE INVENTION

It is therefore an object of the present invention to solve the problem indicated above, that is, to control the moving speed of a moving body, so as to minimize the amount of overshoot and consequent vibration of the moving speed. This object may be achieved according to any one of the following modes of the present invention in the form of a speed control method or apparatus, each of which is numbered like the appended claims and depends from the other mode or modes, where appropriate, for easier understanding of technical features disclosed in the present application and possible combinations of those features. However, it is to be understood that the invention is not limited to those technical features or combinations thereof, and that any one of a plurality of technical features described below with respect to any one mode of the invention may be a subject matter of the present invention, without the other technical feature or features being combined with that one technical feature.

(1) A method of feedback-controlling a moving speed of a moving body such that a detected moving speed of said moving body coincides with a predetermined target speed value, comprising the steps of:

changing a target speed of said moving body by sequentially establishing a plurality of target speed values including a final target speed value, in at least an accelerating region between a zero position at which a movement of the moving body is initiated, and a predetermined position at which the detected moving speed should coincide with the final target speed value; and controlling the moving speed of the moving body such that the detected moving speed coincides with a presently established one of the plurality of target speed values.

In the speed control method according to the above mode (1) of this invention, the target speed of the moving body is changed by sequentially establishing a plurality of target speed values including a final target speed value, making it possible to prevent an abrupt rise of the actual moving speed of the moving body to the final target speed value, which would take place in the conventional arrangement in which the moving speed of the moving body is controlled from the very beginning of the movement of the moving body from the zero position such that the detected moving speed coincides with the final target speed value.

(2) A method according to the above mode (1), wherein the step of changing a target speed comprises sequentially establishing the plurality of target speed values such that the presently established target speed value gradually increases with a lapse of time after a moment at which the movement of the moving body is initiated.

(3) A method according to the above mode (1) or (2), wherein the step of changing a target speed comprises variably setting a transient target speed of the moving body on the basis of the detected moving speed and the final target speed value of the moving body, and the step of controlling the moving speed of the moving body comprises controlling the moving speed such that the detected moving speed coincides with the transient target speed.

In the speed control method according to the above mode (3) of this invention, the transient target speed is set to be a value between the detected moving speed and the final target speed, for example, so that it is possible to prevent an abrupt rise of the actual moving speed of the moving body to the final target value, which would take place in the conventional arrangement in which the moving speed of the moving body is controlled from the very beginning of the movement of the moving body from the zero position such that the detected moving speed coincides with the final target speed.

(4) A method according to the above mode (3), wherein the step of variably setting a transient target speed comprises a step of repeatedly updating the transient target speed at a predetermining timing.

The transient target speed is preferably repeatedly updated at a predetermined timing, as in the above mode (4). In the present arrangement wherein the transient target speed is updated to a suitable value corresponding to the moving speed of the moving body, at the predetermined suitable timing, the moving speed can be smoothly raised to the final target speed as the moving body is moved in the accelerating region from the zero position to the predetermined position. In other words, the method according to the above mode (4) is effective to prevent the moving speed of the moving body from being considerably higher or lower than the final target speed when the moving body has reached the predetermined position, that is, effective to prevent an undesirable periodic change or oscillation of the moving speed after the moving body has entered a constant-speed region moving speed of the moving body should coincide with a final target speed value, and the step of controlling the moving speed of the moving body comprises controlling the moving speed of the moving body such that the detected moving speed coincides with at least one transient target speed value in a transient period between the first moment and a last one of the at least one target-speed changing moment, and such that the detected moving speed coincides with a final target speed value in a final period between the last one of the at least one target-speed changing moment and the second moment.

In the speed control method according to the above mode (8) of the present invention, the moving speed of the moving object can be increased in steps to the final target speed value via at least one transient target speed value, without an overshoot and consequent oscillation or vibration around the second moment at which the moving speed should coincide with the final target speed.

(9) A method according to the above mode (8), further comprising the steps of:

monitoring the moving speed of the moving body at each of at least one speed-monitoring moment;

determining whether the moving speed of the moving body monitored at each speed-monitoring moment is within a predetermined allowable range; and when the moving speed monitored at each speed-monitoring moment is not within the predetermined allowable range, adjusting a mode of control of the moving speed following the accelerating region. In the event of occurrence of the periodic change of the moving speed, the actual moving speed can be stabilized at the final target speed only after a considerable time has passed after the moving body has reached the predetermined position at which the moving speed should be at the final target value.

(5) A method according to the above mode (4), wherein the step of repeatedly updating the transient target speed at a predetermined timing comprises a step of updating the transient target speed when each of at least one predetermined time has passed after a moment of initiation of the movement of the moving body from the zero position.

(6) A method according to the above mode (4), wherein the step of repeatedly updating the transient target speed at a predetermined timing comprises a step of updating the transient target speed when the moving body has reached each of at least one predetermined position.

(7) A method according to the above mode (4), wherein the step of repeatedly updating the transient target speed at a predetermined timing comprises a step of updating the transient target speed when the moving body has moved by each of at least one predetermined distance.

(8) A method according to the above mode (1) or (2), wherein the step of changing a target speed comprises setting at least one target-speed changing moment in an accelerating period between a first moment at which a movement of the moving body is initiated and a second moment at which the of the moving body such that the moving speed monitored at each speed-monitoring moment in a next cycle of control of the moving speed of the moving body will be held within the predetermined allowable range.

In the speed control method according to the above mode (9), the mode of control of the moving speed of the moving body can be adjusted, depending upon a variation in the operating condition of the moving body and the environment of the moving body, so that an excessively high or low rate of change of the moving speed of the moving body which is caused due to such variation and detected in the accelerating period between the first and second moments in the present cycle of control can be eliminated in the next cycle of control. Namely, the speed control method according to the above mode (9) is effective to prevent an overshoot of the moving speed of the moving body beyond the final target speed value or a failure of the moving speed to reach the final target speed value, which would take place due to the variation in the operating condition of the moving body and the environment of the moving body.

(10) A method according to the above mode (9), wherein the at least one speed-monitoring moment corresponds to the at least one target-speed changing moment, and the step of adjusting a mode of control of the moving speed of the moving body comprises shifting each of at least one of the at least one target-speed changing moment when the moving speed monitored at the speed-monitoring moment corresponding to each of the at least one of the at least one target-speed changing moment is not within the predetermined allowable range.

(11) A method according to the above mode (9), wherein the at least one speed-monitoring moment corresponds to the at least one target-speed changing moment and the at least one transient target speed value, and the step of adjusting a mode of control of the moving speed of the moving body comprises changing each of at least one of the at least one transient target speed value which corresponds to each of at least one of the at least one target-speed changing moment, when the moving speed monitored at the speed-monitoring moment corresponding to each of the at least one of the at least one target-speed changing moment is not within the predetermined allowable range.

(12) A method according to any one of the above modes (8)–(11), wherein the at least one target-speed changing moment consists of one target-speed changing moment, and the at least one transient target speed value consists of one transient target speed value, the step of controlling the moving speed of the moving body comprising controlling the moving speed such that the detected moving speed coincides with the one transient target speed value in the transient period between the first moment and the one target-speed changing moment, and such that the detected moving speed coincides with the final target speed value in the final period between the one target-speed changing moment and the second moment.

(13) A method according to any one of the above modes (8)–(11), wherein the at least one target-speed changing moment consists of a plurality of target-speed changing moments, and the at least one transient target speed value consists of a plurality of transient target speed values.

(14) A method according to the above mode (13), wherein the plurality of target-speed changing moments consist of a first target-speed changing moment and a second target-speed changing moment, and the plurality of transient target speed values consist of a first transient target speed value and a second transient target speed value higher than the first transient target speed value, the step of controlling the moving speed of the moving body comprising controlling the moving speed such that the detected moving speed coincides with the first transient target speed value in a first portion of the transient period between the first moment and the first target-speed changing moment, such that the detected moving speed coincides with the second transient target speed value in a second portion of the transient period between the first and second target-speed changing moments, and such that the detected moving speed coincides with the final target speed value in the final period between the second target-speed changing moment and the second moment.

(15) An apparatus for feedback-controlling a moving speed of a moving body, comprising:

a target-speed changing portion operable to change a target speed of the moving body by sequentially establishing a plurality of target speed values including a final target speed value, in at least an accelerating region between a zero position at which a movement of the moving body is initiated, and a predetermined position at which the detected moving speed should coincide with the final target speed value; and a moving-speed controlling portion operable to control the moving speed of the moving body such that the detected moving speed coincides with a presently established one of the plurality of target speed values.

The apparatus according to the above mode (15) has substantially the same advantage as the method according to the above mode (1).

(16) An apparatus according to the above mode (15), wherein said target-speed changing portion sequentially establishes the plurality of target speed values such that the presently established target speed value gradually increases with a lapse of time after a moment at which the movement of the moving body is initiated.

(17) An apparatus according to the above mode (15) or (16), further comprising:

a drive-force generator operable to generate a drive force to be applied to said moving body;

a moving-speed detecting portion operable to detect the moving speed of the moving body; and a drive-force controlling portion operable to control the drive-force generator according to a moving-speed control signal, and wherein the moving-speed controlling portion includes a control-signal generating portion operable to generate the moving-speed control signal for controlling the moving speed of the moving body such that the moving speed detected by the moving-speed detecting portion coincides with a transient target speed, and the target-speed changing portion includes a variably setting portion operable to variably set the transient target speed ($V_{obj}$) on the basis of the moving speed ($V_i$) detected by the moving-speed detecting portion and the final target speed value ($V_{tg}$).

In the speed control apparatus according to the above mode (17) of the present invention, the drive-force generator applies the generated drive force to the moving body, and the moving-speed detecting portion detects the moving speed of the moving body. The control-signal generating portion generates the moving-speed control signal for controlling the moving speed of the moving body such that the moving speed detected by the moving-speed detecting portion coincides with a transient target speed, and the drive-force controlling portion controls the drive-force generator according to the moving-speed control signal.

In at least the accelerating region between the zero position at which the movement of the moving body is initiated and the predetermined position at which the detected moving speed should coincide with the final target speed, the variably setting portion is operated to variably set the transient target speed on the basis of the moving speed detected by the moving-speed detecting portion and the final target speed.

That is, the speed control apparatus according to the above mode (17) is arranged to practice the speed control method according to the above mode (3), and has substantially the same advantages as this speed control method.

(18) An apparatus according to the above mode (17), wherein the variably setting portion repeatedly updates the transient target speed at a predetermined timing.

That is, the apparatus according to the above mode (18) is arranged to practice the speed control method according to the above mode (4), and has substantially the same advantage as this speed control method.

(19) An apparatus according to the above mode (18), wherein the variably setting portion repeatedly updates the transient target speed when each of at least one predetermined time has passed after a moment of initiation of the movement of the moving body from the zero position.

(20) An apparatus according to the above mode (18), wherein the variably setting portion repeatedly updates the transient target speed when the moving body has reached each of at least one predetermined position.

(21) An apparatus according to the above mode (18), wherein the variably setting portion repeatedly updates the transient target speed when the moving body has moved by each of at least one predetermined distance.

(22) An apparatus according to any one of the above modes (17)–(21), wherein the variably setting portion determines the transient target speed to be lower than the final target speed.

The speed control apparatus according to the above mode (22) prevents excessively rapid acceleration of the moving body, permitting improved stability of control of the moving speed of the moving body.

(23) An apparatus according to any one of the above modes (17)–(22), wherein the variably setting portion obtains the transient target speed $V_{obj}$ according to an equation, $V_{obj}=(V_{tg}-V_i) \times G + V_i$, wherein "$V_{tg}$", "$V_i$" and "$G$" represent the final target speed, the detected moving speed and a coefficient, respectively.

(24) An apparatus according to the above mode (23), wherein the coefficient (G) is larger than zero and smaller than one.

Where the transient target speed Vobj is obtained according to the equation according to the above mode (23) and with the coefficient (G) being smaller than one as in the mode (24), the transient target speed obtained upon initiation of the movement of the moving body is equal to (G×Vtg), which is lower than the final target speed Vtg, so that the moving speed is controlled so as to coincide with the obtained transient target speed (G×Vtg). As the moving speed Vi of the moving body detected by the moving-speed detecting portion is raised as a result of acceleration of the moving body, the transient target speed Vobj is increased with a rise of the detected moving speed Vi, so that the moving speed Vi gradually approaches the final target speed Vtg.

In the speed control apparatus according to the above mode (24), therefore, the moving speed Vi of the moving body can be smoothly or gradually raised to the final value Vtg, without an overshoot and a consequent vibration or oscillation, which would take place in the case where the moving speed Vi of the moving body is controlled from the very beginning of the movement of the moving body from the zero position, so as to follow or coincide with the final target speed Vtg.

(25) An apparatus according to the above mode (23) or (24), further comprising a programmable register which stores the coefficient (G) and which is externally accessible to change a value of the coefficient, and wherein the variably setting portion is connected to the register to receive the coefficient used to obtain the transient target speed.

In the speed control apparatus according to the above mode (25), the value of the coefficient (G) stored in the register may be changed depending upon a moving characteristic of the moving body, so that the rate of change of the moving speed of the moving body can be adjusted. In this case, the moving speed of the moving body can be raised to the transient target speed, without an overshoot, irrespective of a change in the moving characteristic of the moving body.

(26) An apparatus according to any one of the above modes (17)–(25), wherein the control-signal generating portion generates the moving-speed control signal by PID control processing of the moving speed detected by the moving-speed detecting portion and the transient target speed updated by the variably setting portion.

In the speed control apparatus according to the above mode (26), the moving speed of the moving body can follow the transient target speed and final target speed with a high response to a change in the moving speed, and without a residual speed control error between the detected moving speed and the transient target speed.

(27) An apparatus according to any one of the above modes (17)–(26), wherein the drive-force generator is a converter operable to convert an electric energy into the drive force.

(28) An apparatus according to the above mode (27), wherein the converter is an electric motor.

(29) An apparatus according to the above mode (15) or (16), wherein the moving-speed controlling portion includes a control-signal generating portion operable to generate a moving-speed control signal for controlling the moving speed of the moving body, the apparatus further comprising:

a drive-force generator operable to generate a drive force to be applied to the moving body;

a moving-speed detecting portion operable to detect the moving speed of the moving body;

a drive-force controlling portion operable to control the drive-force generator according to the moving-speed control signal generated by the control-signal generating portion;

a transient-target-speed-value supplying portion operable to supply the control-signal generating portion with at least one transient target speed value; and a final-target-speed-value supplying portion operable to supply the control-signal generating portion with the final target speed value, and wherein the target-speed changing portion is operable to set at least one target-speed changing moment in an accelerating period between a first moment at which the movement of the moving body is initiated and a second moment at which the moving speed of the moving body should coincide with the final target speed value, the target-speed changing portion operating the transient-target-speed-value supplying portion to supply the control-signal generating portion with the at least one transient target speed value in a transient period between the first moment and a last one of the at least one target-speed changing moment, and operating the final-target-speed-value supplying portion to supply the control-signal generating portion with the final target speed value in a final period between the last one of said at least one target-speed changing moment and said second moment.

In the speed control apparatus according to the above mode (29) of this invention, the drive-force generator is operated to apply a drive force to the moving body, and the moving-speed detecting portion detects the moving speed of the moving body. The control-signal generating portion is arranged to generate a moving-speed control signal for controlling the moving speed of the moving body such that the moving speed detected by the moving-speed detecting portion coincides with a predetermined target speed value, and the drive-force controlling portion controls the drive-force generator according to the moving-speed control signal generated by the control-signal generating portion.

Further, the target-speed changing portion is arranged to set at least one target-speed changing moment in the accelerating period between a first moment at which the movement of the moving body is initiated and a second moment at which the moving speed should coincide with a final target speed value. The target-speed changing portion is further arranged to operate the transient-target-speed-value supplying portion to supply the control-signal generating portion with at least one transient target speed value in the transient period between the first moment and a last one of the at least one target-speed changing moment, and operate the final-target-speed-value supplying portion to supply the control-signal generating portion with the final target speed value in the final period between the last target-speed changing moment and the second moment.

Namely, the speed control apparatus according to the above mode (29) is arranged to practice the speed control method according to the above mode (8), and has substantially the same advantages as this speed control method.

(30) An apparatus according to the above mode (29), further comprising:

a moving-speed monitoring portion operable to monitor the moving speed of the moving body at each of at least one speed-monitoring moment; and an adjusting portion operable when the moving speed of the moving body monitored at each speed-monitoring moment is not within a predetermined allowable range, the adjusting portion adjusting a mode of control of the moving speed of the moving body such that the moving speed monitored at each speed-monitoring moment in a next cycle of control of the moving speed of the moving body will be held within the predetermined allowable range.

That is, the speed control apparatus according to the above mode (30) is arranged to practice the speed control method according to the above mode (9), and has substantially the same advantage as this speed control method.

(31) An apparatus according to the above mode (30), wherein the at least one speed-monitoring moment corresponds to the at least one target-speed changing moment, and the adjusting portion is operable to shift each of at least one of the at least one target-speed changing moment when the moving speed monitored at the speed-monitoring moment corresponding to each of the at least one of the at least one target-speed changing moment is not within the predetermined allowable range.

Where the rate of increase of the moving speed of the moving body in the accelerating period is excessively high, causing an overshoot of the moving speed beyond the final target speed value around the second moment, the appropriate target-speed changing moment is delayed by the adjusting portion according to the above mode (31), so as to lower the rate of increase of the moving speed in the accelerating period, for thereby preventing the overshoot in the next cycle of control of the moving speed. Where the rate of increase of the moving speed in the accelerating period is excessively low, causing a failure of the moving speed to reach the final target speed value at the second moment, on the other hand, the appropriate target-speed changing moment is advanced by the adjusting portion, so as to increase the rate of increase of the moving speed in the accelerating period, for thereby permitting the moving speed to reach the final target speed value at the second moment, in the next cycle of control of the moving speed.

(32) An apparatus according to the above mode (30), wherein the at least one speed-monitoring moment corresponds to the at least one target-speed changing moment and the at least one transient target speed value, and the adjusting portion is operable to change each of at least one of the at least one transient target speed value which corresponds to each of at least one of the at least one target-speed changing moment, when the moving speed monitored at the speed-monitoring moment corresponding to each of the at least one of the at least one target-speed changing moment is not within the predetermined allowable range.

Where the rate of increase of the moving speed of the moving body in the accelerating period is excessively high, causing an overshoot of the moving speed beyond the final target speed value around the second moment, the appropriate transient target speed value is reduced by the adjusting portion according to the above mode (32), so as to lower the rate of increase of the moving speed in the accelerating period, for thereby preventing the overshoot in the next cycle of control of the moving speed. Where the rate of increase of the moving speed in the accelerating period is excessively low, causing a failure of the moving speed to reach the final target speed value at the second moment, on the other hand, the appropriate transient target speed value is increased by the adjusting portion, so as to increase the rate of increase of the moving speed in the accelerating period, for thereby permitting the moving speed to reach the final target speed value at the second moment, in the next cycle of control of the moving speed.

(33) An apparatus according to any one of the above modes (29)–(32), wherein the transient-target-speed-value supplying portion is operable to supply the control-signal generating portion with one transient target speed value, and the target-speed changing portion is operable to set one target-speed changing moment in the accelerating period, the target-speed changing portion operating the transient-target-speed-value supplying portion to supply the control-signal generating portion with the one transient target speed value in the transient period between the first moment and the one target-speed changing moment, and operating the final-target-speed-value supplying portion to supply the control-signal generating portion with the final target speed value in the final period between the one target-speed changing moment and the second moment.

(34) An apparatus according to any one of the above modes (29)–(32), wherein the transient-target-speed-value supplying portion is operable to supply the control-signal generating portion with a plurality of transient target speed values, and the target-speed changing portion is operable to set a plurality of target-speed changing moments in the accelerating period and operate the transient-target-speed-value supplying portion to supply the control-signal generating portion with the plurality of transient target speed values at said plurality of target-speed changing moments, respectively.

In the speed control apparatus constructed according to the above mode (34), the moving speed of the moving body can be controlled intricately in the accelerating period.

(35) An apparatus according to the above mode (34), wherein the transient-target-speed-value supplying portion is operable to supply the control-signal generating portion with a first transient target speed value and a second transient target speed value higher than the first transient target speed value, and the target-speed changing portion is operable to set a first target-speed changing moment and a second target-speed changing moment in the accelerating period, the target-speed changing portion being operable to operate the transient-target-speed-value supplying portion to supply the control-signal generating portion with the first transient target speed value in a first portion of the transient period between the first moment and the first target-speed changing moment, and the second transient target speed value in a second portion of the transient period between the first and second target-speed changing moments, the target-speed changing portion being further operable to operate the final-target-speed-value supplying portion to supply the control-signal generating portion with the final target speed value in the final period between the second target-speed changing moment and the second moment.

(36) An apparatus according to the above mode (34) or (35), further comprising:

a moving-speed monitoring portion operable to monitor the moving speed of the moving body at each of a plurality of speed-monitoring moments corresponding to the plurality of target-speed changing moments; and an adjusting portion operable when the moving speed of the moving body monitored at each of the plurality of target-speed monitoring moments is not within a predetermined allowable range, the adjusting portion shifting each of at least one of the plurality of target-speed changing moments, when the moving speed monitored at the speed-monitoring moment corresponding to each of the at least one of the plurality of target-speed changing moments is not within a predetermined allowable range.

The adjusting portion provided according to the above mode (36) permits a more intricate control of the moving speed of the moving body in the next cycle of control of the moving speed, where the rate of increase of the moving speed in the accelerating period in the present cycle of control is excessively high or low.

(37) An apparatus according to any one of the above modes (29)–(36), wherein the transient-target-speed-value supplying portion is operable to supply the control-signal generating portion with the at least one transient target speed value such that each of the at least one transient target speed value is lower than the final target speed value.

The speed control apparatus according to the above mode (37) is particularly effective to prevents an overshoot of the moving speed beyond the final target speed or an oscillation of the moving speed around the second moment.

(38) An apparatus according to any one of the above modes (29)–(37), wherein the control-signal generating portion generates the moving-speed control signal by proportional, integral and differential calculating operations performed with respect to the moving speed of the moving body detected by the moving-speed detecting portion and one of the at least one transient target speed value and the final target speed value.

In the speed control apparatus according to the above mode (38), the moving speed of the moving body can follow the transient target speed value or values and the final target speed value, with a high response to a change in the moving speed, and without a residual speed control error between the detected moving speed and the target speed values.

(39) An apparatus according to any one of the above modes (29)–(38), wherein the drive-force generator is a converter operable to convert an electric energy into the drive force.

(40) An apparatus according to the above mode (39), wherein the converter is an electric motor.

(41) A method of controlling a moving speed of a moving body such that the detected moving speed coincides with a predetermined target value, comprising the steps of:

variably setting a transient target speed of the moving body on the basis of the detected moving speed and a final target speed of the moving body, in at least an accelerating region between a zero position at which a movement of the moving body is initiated, and a predetermined position at which the detected moving speed should coincide with the final target speed; and controlling the moving speed of the moving body such that the detected moving speed coincides with the transient target speed.

(42) An apparatus for controlling a moving speed of a moving body, comprising:

a drive-force generator operable to generate a drive force to be applied to the moving body;

a moving-speed detecting portion operable to detect the moving speed of the moving body;

a control-signal generating portion operable to generate a moving-speed control signal for controlling the moving speed of the moving body such that the moving speed detected by said moving-speed detecting portion coincides with a transient target speed;

a drive-force controlling portion operable to control the drive-force generator according to the moving-speed control signal generated by the control-signal generating portion; and a variably setting portion operable to variably set the transient target speed on the basis of the moving speed detected by the moving-speed detecting portion and the final target speed, in at least an accelerating region between a zero position at which a movement of the moving body is initiated, and a predetermined position at which the detected moving speed should coincide with the final target speed.

(43) A method of controlling a moving speed of a moving body such that the detected moving speed coincides with a predetermined target speed value, comprising the steps of:

setting at least one target-speed changing moment in an accelerating period between a first moment at which a movement of the moving body is initiated and a second moment at which the moving speed of the moving body should coincide with a final target speed value; and controlling the moving speed of the moving body such that the detected moving speed coincides with at least one transient target speed value in a transient period between the first moment and a last one of the at least one target-speed changing moment, and such that the detected moving speed coincides with a final target speed value in a final period between the last one of the at least one target-speed changing moment and the second moment.

(44) An apparatus for controlling a movement speed of a moving body, comprising:

a drive-force generator operable to generate a drive force to be applied to the moving body;

a moving-speed detecting portion operable to detect the moving speed of the moving body;

a control-signal generating portion operable to generate a moving-speed control signal for controlling the moving speed of the moving body such that the moving speed detected by the moving-speed detecting portion coincides with a predetermined target speed value;

a drive-force controlling portion operable to control the drive-force generator according to the moving-speed control signal generated by the control-signal generating portion;

a transient-target-speed-value supplying portion operable to supply the control-signal generating portion with at least one transient target speed value;

a final-target-speed-value supplying portion operable to supply the control-signal generating portion with a final target speed value; and a target-speed changing portion operable to set at least one target-speed changing moment in an accelerating period between a first moment at which a movement of the moving body is initiated and a second moment at which the moving speed of the moving body should coincide with the final target speed value, the target-speed changing portion operating the transient-target-speed-value supplying portion to supply the control-signal generating portion with the at least one transient target speed value in a transient period between the first moment and a last one of the at least one target-speed changing moment, and operating the final-target-speed-value supplying portion to supply the control-signal generating portion with the final target speed value in a final period between the last one of the at least one target-speed changing moment and the second moment.

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which:

FIGS. 11A, 11B and 11C are views for explaining one example of an operation of the carriage motor control apparatus of FIG. 8 to control the speed of the carriage;

DETAILED DESCRIPTION OF THE PREFERRED EMBODIMENTS

Figure 1:
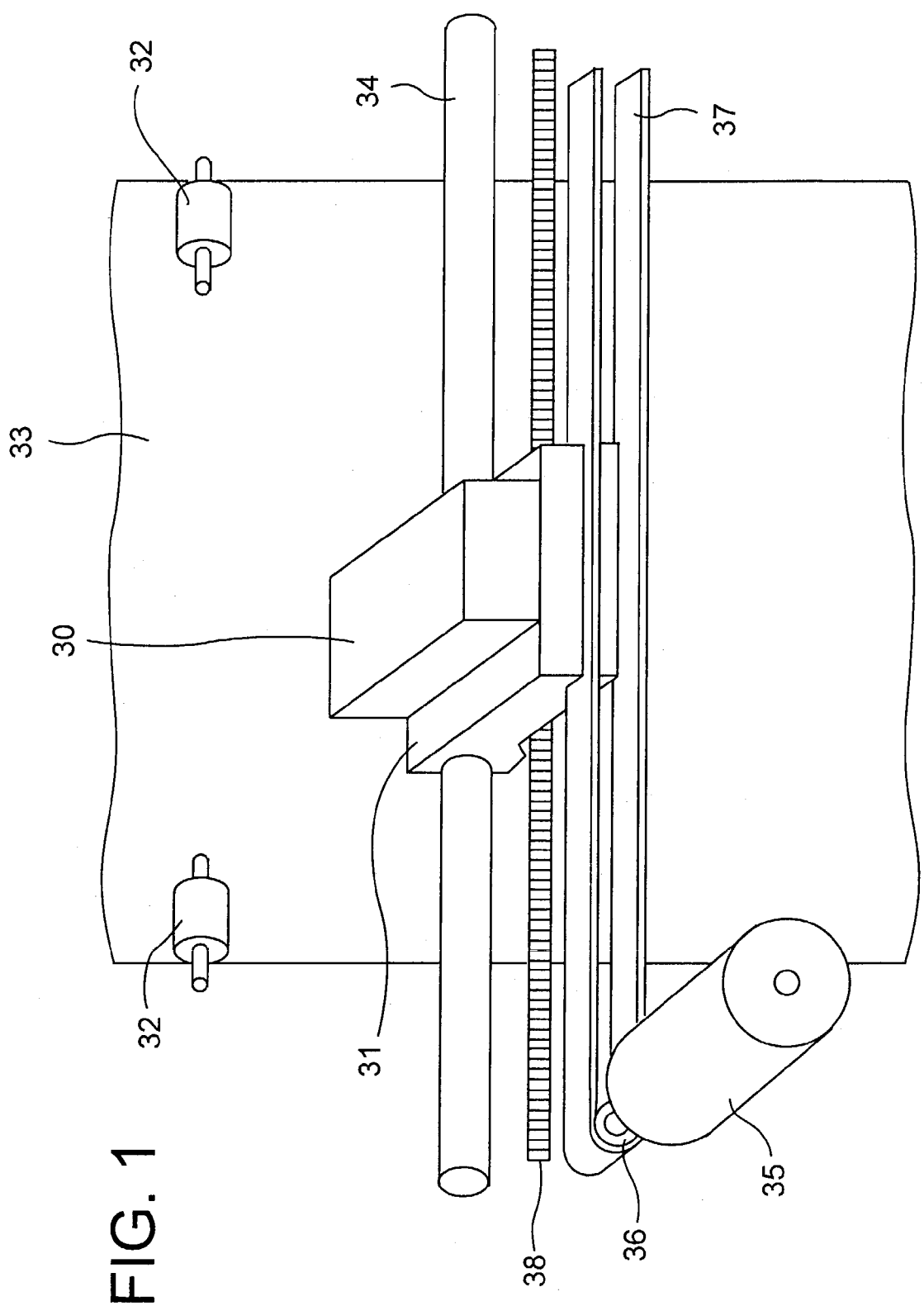
FIG. 1 is a schematic view showing a carriage drive mechanism in an ink-jet printer, to which speed control method and apparatus of the present invention are applicable.

There will be described some preferred embodiments of the present invention, by reference to the accompanying drawings. Referring first to FIG. 1, there is shown a carriage drive mechanism in an ink-jet printer (hereinafter referred to simply as "printer") incorporating a carriage motor control apparatus constructed according to one embodiment of the invention.

As shown in FIG. 1, the printer has a sheet feeding mechanism which includes presser rolls 32 and which is arranged to feed a sheet of paper 33 in a predetermined feeding direction. The printer further has a guide rod 34 disposed so as to extend in a width direction of the paper sheet 33, which is perpendicular to the above-indicated feeding direction. The printer also has a printing head 30 mounted on a moving body in the form of a carriage 31 which is slidably supported and guided by the guide rod 34. The printing head 30 has nozzles for injecting an ink onto the paper sheet 33. The carriage 31 is connected to an endless belt 37 extending in parallel with the guide rod 34, and is held in engagement with a driving pulley 36 and a driven or idler pulley (not shown). The driving pulley 36 is driven by a carriage drive motor 35 (hereinafter referred to as "CR motor 35") located at one end of the guide rod 34, while the idler pulley is located at the other end of the guide rod 34.

In the carriage drive mechanism constructed as described above, the carriage 31 is arranged to be reciprocated in the width direction of the paper sheet 33 parallel to the guide rod 34, with a drive force which is produced by the CR motor 35 and which is transmitted to the carriage 31 through the endless belt 37.

Under the guide rod 34, there is disposed a timing scale 38 extending along the guide rod 34. The timing scale 38 has a succession of slits each of which has a predetermined width and which are formed such that the slits are equally spaced apart from each other by a predetermined distance (for example, 1/150 inch or about 0.17 mm) in the direction of movement of the carriage 31. On the underside of the carriage 31, there is disposed a detecting portion in the form of a photo-interrupter including one light-emitting element and at least two light-receiving or photosensitive elements, which are arranged such that each light-emitting element is opposed to the at least two light-receiving elements, with the timing scale 38 interposed therebetween. This detecting portion cooperates with the timing scale 38 to constitute a linear encoder 39 (shown in FIG. 3).

Figure 2:
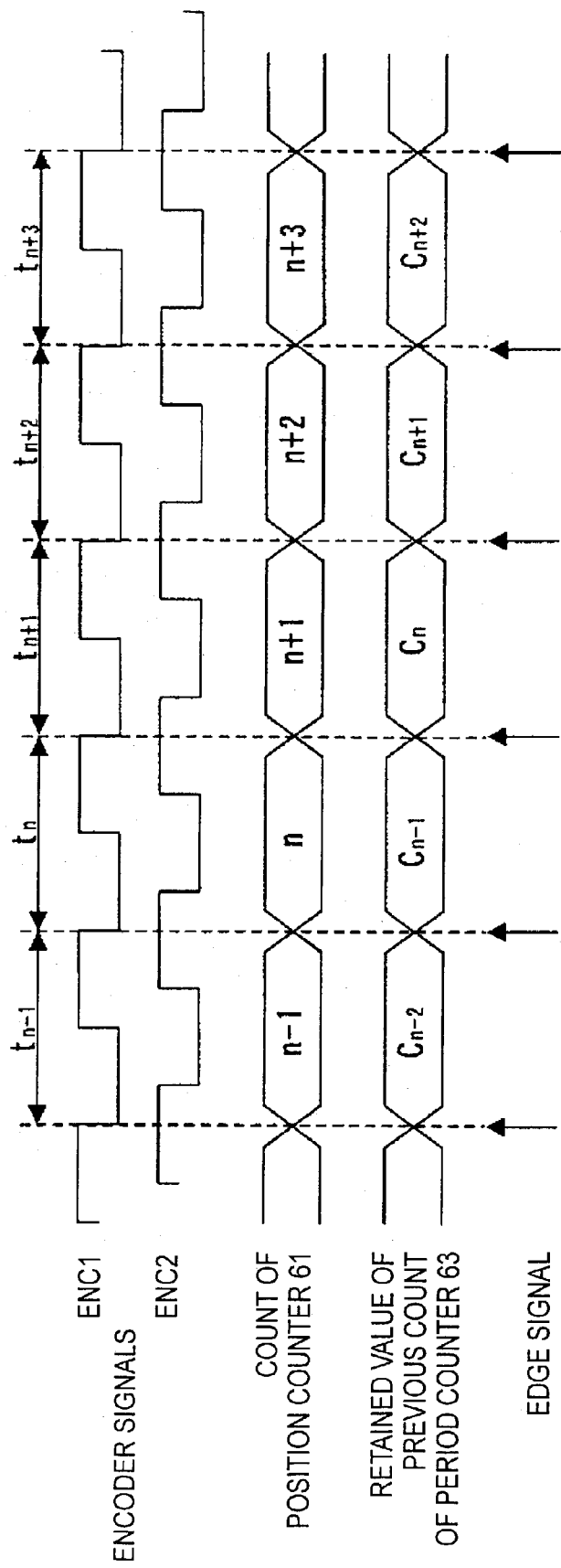
FIG. 2 is a view schematically showing encoder signals generated by a linear encoder provided on a carriage of the printer, and other signals generated based on the encoder signals.

The detecting portion of the linear encoder 39 generates two kinds of encoder signals ENC1 and ENC2 which have a phase difference of about ¼ of the period, as indicated in FIG. 2. When the carriage 31 is moved in a forward direction (right direction as seen in FIG. 1) from the home position (leftmost position as seen in FIG. 1) toward the idler pulley, the phase of the first encoder signal ENC1 is advanced by about ¼ of the period with respect to the second encoder signal ENC2. When the carriage 31 is moved in a reverse direction from the idler pulley toward the home position, the phase of the first encoder signal ENC1 is retarded by about ¼ of the period with respect to the second encoder signal ENC2.

Figure 6:
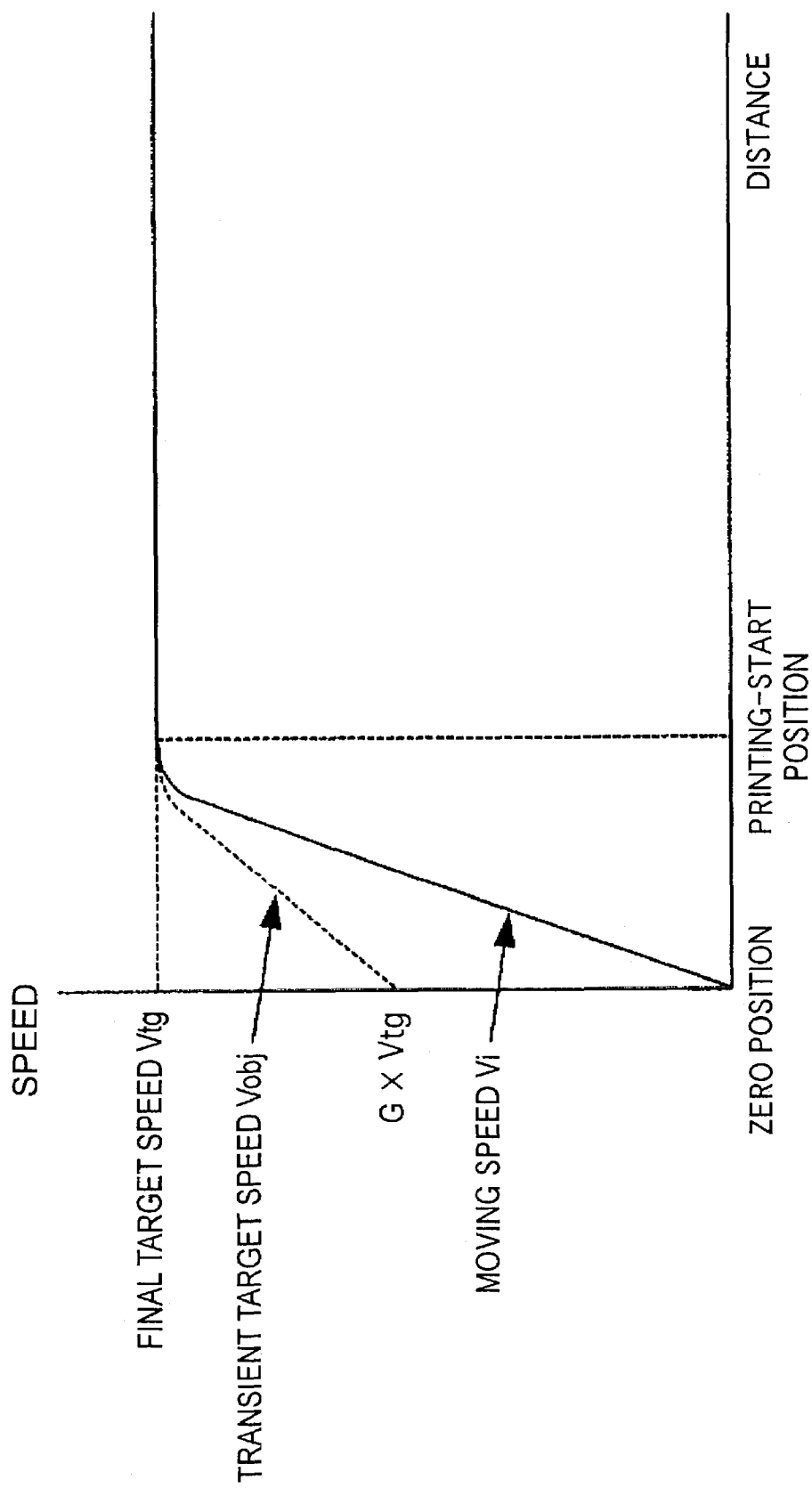
FIG. 6 is a view for explaining an operation of the carriage motor control apparatus to control the speed of the carriage.
Figure 17:
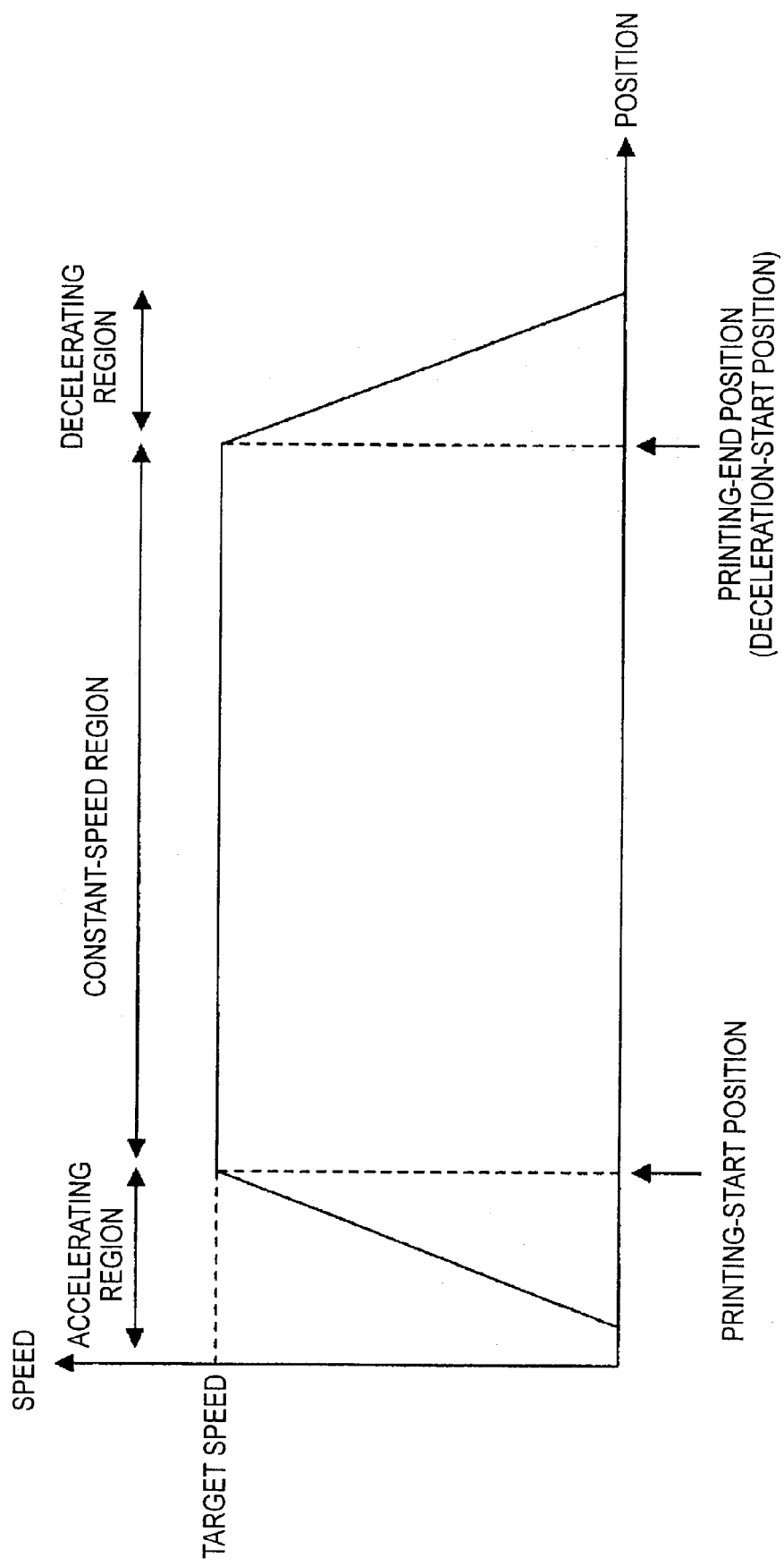
FIG. 17 is a view schematically illustrating a manner in which the movement of the carriage is controlled.
Figure 18A:
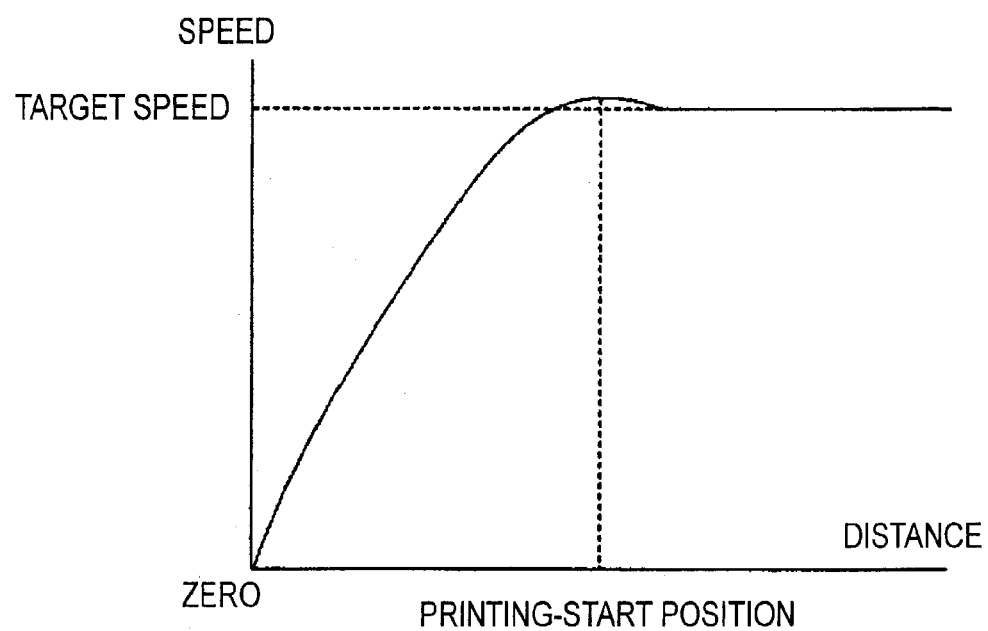
FIGS. 18A and 18B are views for explaining a speed control in the prior art.
Figure 18B:
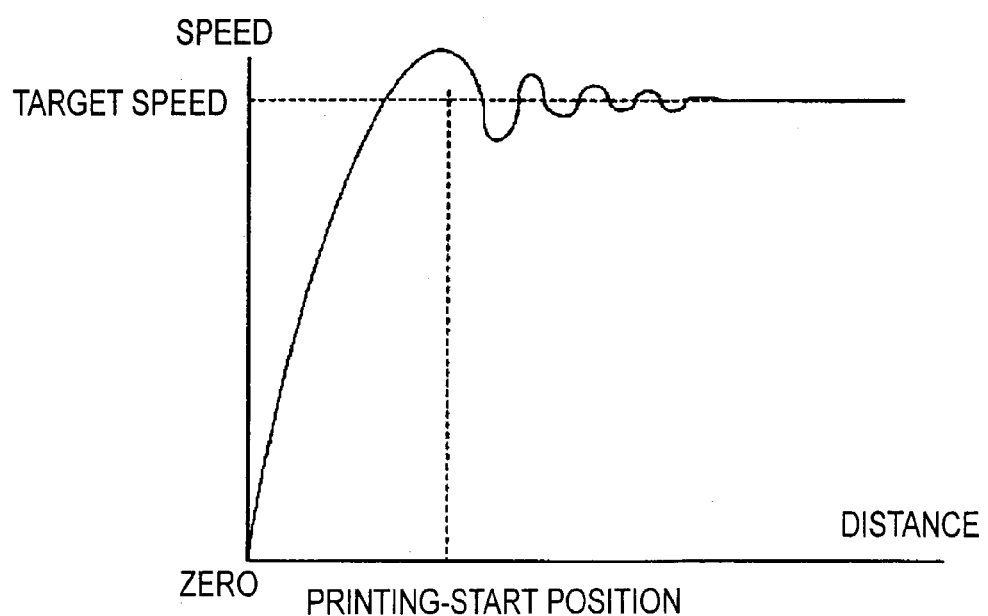

The graph of FIG. 6 indicates a change in the moving speed of the carriage 31 in relation to its position in the moving direction. While the printer is not in a printing operation, the carriage 31 is located at the home position set in the vicinity of the above-indicated one end of the guide rod 34 on the side of the driving pulley 36, or located at a position at which the last printing operation was terminated. From one of these positions (hereinafter collectively referred to as "zero position"), a movement of the carriage 31 is initiated when a printing operation (next printing operation) is initiated. As indicated in FIG. 17, the carriage 31 is initially accelerated during a period of movement from the zero position to a predetermined printing-start position, such that the moving speed of the carriage 31 is increased to a predetermined desired or target value when the carriage 31 reaches the printing-start position. During a subsequent movement from the printing-start position to a predetermined printing-end position, the moving speed is held constant at the predetermined target speed. After the used for controlling the CR motor 35. The carriage detecting portion 6 is arranged to calculate the position and moving speed of the carriage 31 on the basis of the encoder signals ENC1, ENC2 received from the linear encoder 39. The motor control portion 7 is arranged to control the operating speed of the CR motor 35 on the basis of data received from the carriage detecting portion 6. The PWM-signal generating portion 8 is arranged to generate the PWM signal having a duty ratio determined by a motor control signal generated by the motor control portion 7. The clock generating portion 9 is arranged to generate a clock signal having a period which is sufficiently shorter than that of the encoder signals ENC1, ENC2. The clock signal is fed to various portions of the ASIC 3.

The register array 5 includes: a start setting register 51 for starting the CR motor 35; a deceleration-start-position register 52 for setting a deceleration-start position (printing-end position) at which the deceleration of the carriage 31 is initiated; a target-value-coefficient register 53 for setting a target-value coefficient used for calculating a target speed of the carriage 31; a final-target-speed-value register 54 for setting a final target speed of the carriage 31; and a gain register 55 for setting a differential gain, an integral gain and a proportional gain, which are used for feedback calculating operations to control the operating speed (torque) of the CR motor 35.

The carriage detecting portion 6 includes an edge detecting portion 60 operable to generate an edge signal carriage 31 has reached the printing-end position, the carriage 31 is decelerated until it is brought to a stop. In the following description, a region between the zero position and the printing-start position, a region between the printing-start position and the printing-end position, and a region between the printing-end position and the stop position are referred to as an accelerating region, a constant-speed region and a decelerating region, respectively.

<First Embodiment>

Figure 3:
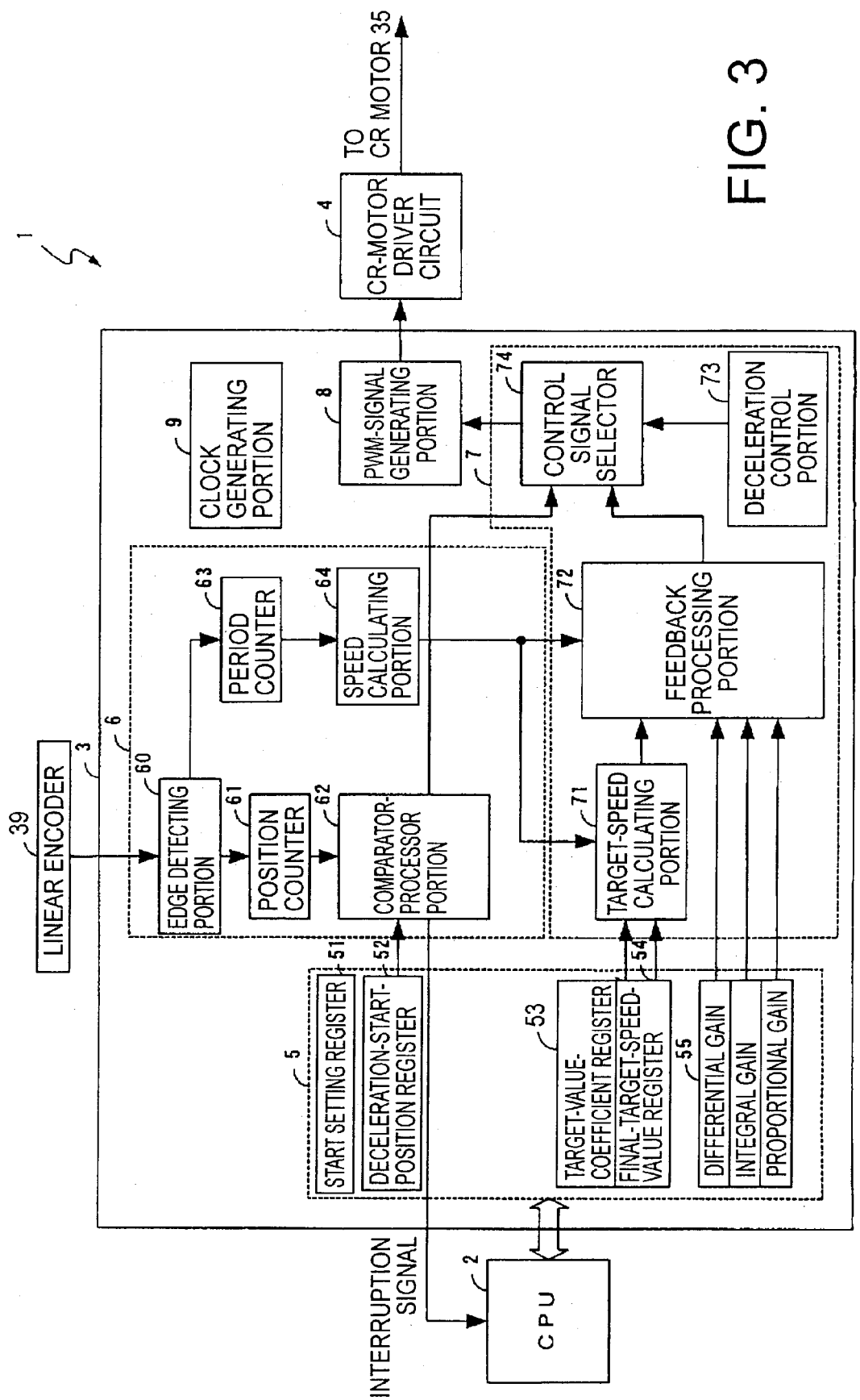
FIG. 3 is a block diagram showing an arrangement of a carriage motor control apparatus constructed according to a first embodiment of this invention.

The block diagram of FIG. 3 shows the carriage motor control apparatus according to a first embodiment, which is generally indicated at 1. As shown in FIG. 3, the carriage motor control apparatus 1 consists of a CPU (central processing unit) 2, an ASIC (Application Specific Integrated Circuit) 3, a CR-motor driver circuit 4, and the above-described linear encoder 39. The CPU 2 controls the printer in a centralized or coordinated manner, and the ASIC 3 generates a PWM signal for controlling speed and direction of operation of the CR motor 35. The CR-motor driver circuit 4 has a H-bridge circuit incorporating four FETs each of which is turned on and off according to the PWM signal generated by the ASIC 3, to control the CR motor 35.

The ASIC 3 incorporates a register array 5, a carriage detecting portion 6, a motor control portion 7, a PWM-signal generating portion 8 and a clock generating portion 9. The register array 5 is arranged to store various parameters indicative of the beginning or end of each period of the first encoder signal ENC1, and to detect the operating direction of the CR motor 35, on the basis of the encoder signals ENC1 and ENC2. In the present embodiment, the edge detecting portion 60 detects the edge of the first encoder signal ENC1 while the second encoder signal ENC2 has a high level. The operating direction of the CR motor 35 is detected to be the forward direction when the detected edge of the first encoder signal ENC1 represents a fall of the signal, and to be the reverse direction when the detected edge of the signal ENC1 represents a rise of the signal. The carriage detecting portion 6 further includes a position counter 61 which is arranged to count the edge signals generated by the edge detecting portion 60. As indicated in FIG. 2, the position counter 61 counts up the generated edge signals in the forward direction, when the operating direction of the CR motor 35 detected by the edge detecting portion 60 corresponds to the forward moving direction of the carriage 31, and counts down the edge signals in the reverse direction when the detected operating direction of the CR motor 35 corresponds to the reverse moving direction of the carriage 31. Thus, the count of the position counter 61 indicates the position of the carriage 31 with respect to the home position, that is, indicates the position of the slit of the timing scale 38 at which the carriage 31 is presently located. For example, the count of the position counter 61 is used to determine whether the carriage 31 is located at the deceleration-start position set in the deceleration-start-position register 51, as described below.

The carriage detecting portion 6 further includes a comparator-processor portion 62 operable to compare the count value "n" of the position counter 61 with a value set in the deceleration-start-position register 52, to determine whether the carriage 31 has been moved to the deceleration-start position, and generate a control switching signal and apply an interruption signal to the CPU 2 when the comparator-processor portion 62 determines that the carriage 31 has reached the deceleration-start position. The carriage detecting portion 6 further includes a period counter 63 operable to detect a period of the edge signals generated by the edge detecting portion 60, by counting the number of the clock signals generated by the clock generating portion 9. The carriage detecting portion 6 also includes a speed calculating portion 64 operable to calculate the moving speed of the carriage 31, on the basis of the spacing distance ($1/150$ inch) of the slits of the timing scale 38 and a time $t_{n-1}$ ($=C_{n-1} \times$ clocking period) determined by a retained value $C_{n-1}$ (indicated in FIG. 2) of the count of the period counter 63 obtained in the previous period of the first encoder signal ENC1.

The motor control portion 7 includes a target-speed calculating portion 71 operable at a predetermined time interval (e.g., 50 μs) obtained on the basis of the counted number of the clock signals, to calculate a transient target speed of movement of the carriage 31, on the basis of the target-value coefficient set in the target-value-coefficient register 53 and the final target speed set in the final-target-speed-value register 54. The motor control portion 7 further includes a feedback processing portion 72 operable on the basis of the differential, integral and proportional gains set in the gain register 55, to generate a speed control signal for controlling the operating speed of the CR motor 35 such that the moving speed of the carriage 31 calculated by the speed calculating portion 64 coincides with the transient target speed calculated by the target-speed calculating portion 71. The motor control portion 7 further includes a deceleration control portion 73 operable to generate a deceleration control signal for decelerating the CR motor 35, and a control signal selector 74 operable to supply the PWM-signal generating portion 8 with a motor control signal. Described in detail, the control signal selector 74 supplies the PWM-signal generating portion 8 with the speed control signal generated by the feedback processing portion 72, before the control signal selector 74 receives the control switching signal from the comparator-processor portion 62, and the deceleration control signal generated by the deceleration control portion 73, after the control signal selector 74 receives the control switching signal from the comparator-processor portion 62.

The target-speed calculating portion 71 is arranged to calculate a transient target speed Vobj of movement of the carriage 31 according to the following equation (1):

$$Vobj = (Vtg - Vi) \times G + Vi \quad (1)$$

In the above equation (1), "Vtg" represents the final target speed of the carriage 31 set in the final-target-speed register 54, and "Vi" represents the actual moving speed of the carriage 31 as calculated by the speed calculating portion 64, while "G" represents the target-value coefficient G set in the target-value-coefficient register 53. It is noted that the target-value coefficient G is a positive value smaller than 1 (0<G<1), so that the transient target speed Vobj is higher than the actual moving speed Vi of the carriage 31 and lower than the final target speed Vtg.

Figure 4:
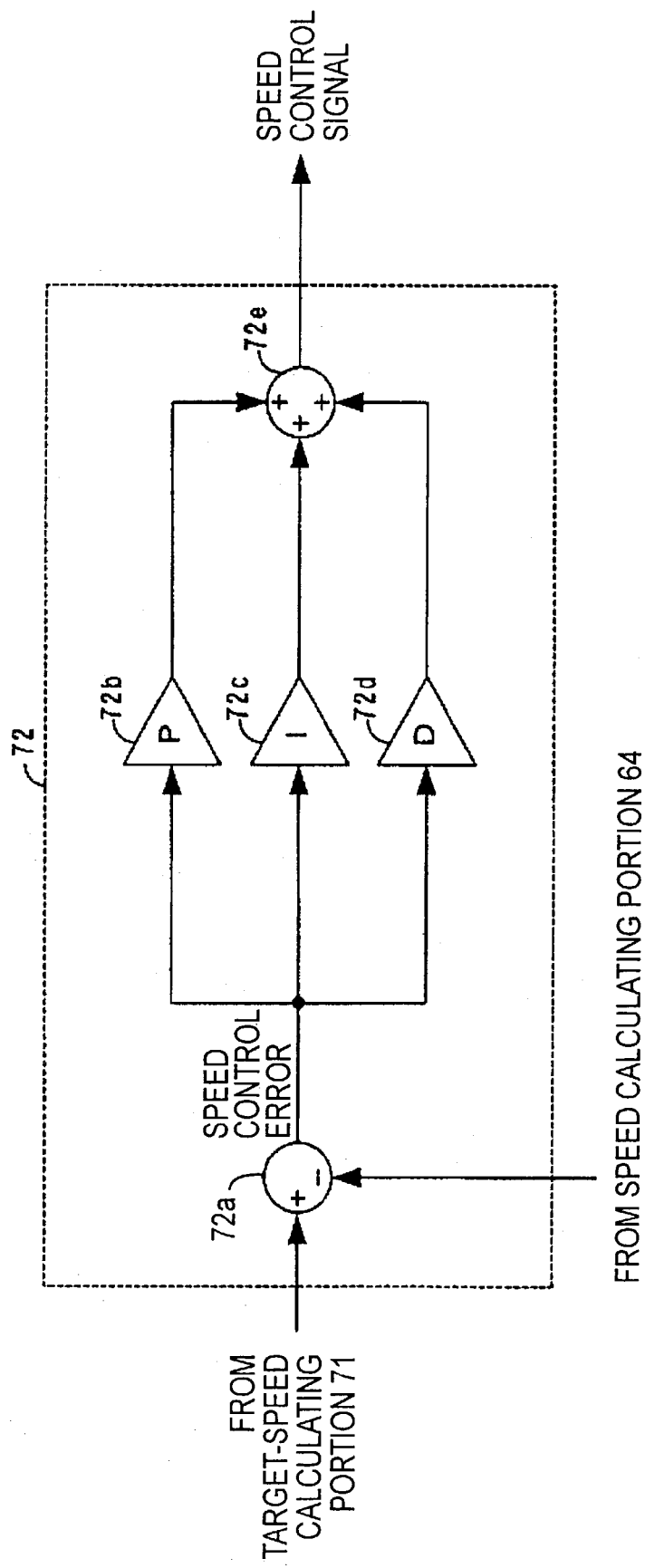
FIG. 4 is a block diagram showing an arrangement of a feedback processing portion of an ASIC of the carriage motor control apparatus.

As indicated in FIG. 4, the feedback processing portion 72 includes: a subtracter 72a operable to calculate a speed control error by subtracting the actual moving speed Vi of the carriage 31 as calculated by the speed calculating portion 64, from the transient target speed Vobj calculated by the target-speed calculating portion 71; a proportional gain operator 72b operable to multiply the speed control error calculated by the subtracter 72a, by the proportional gain Gp set in the gain register 55; an integral operator 72c operable to integrate the speed control error and multiply a thus obtained integral by the integral gain Gi set in the gain register 55; a differential operator 72d operable to differentiate the speed control error and multiply a thus obtained derivative by the differential gain Gd set in the gain register 55; and an arithmetic operator 72e operable to generate the speed control signal (to be applied to the PWM-signal generating portion 8) on the basis of the outputs of the proportional, integral and differential gain operators 72b, 72c and 72d. Thus, the feedback processing portion 72 is arranged to effect a so-called PID control of the CR motor 35.

In the carriage motor control apparatus 1 constructed as described above and shown in FIG. 3, the PWM-signal generating portion 8 is supplied with the motor control signal in the form of the speed control signal generated by the feedback processing portion 72, before the carriage 31 has reached the deceleration-start position, so that the operating speed (torque) of the CR motor 35 is controlled such that the moving speed Vi of the carriage 31 follows the transient target speed Vobj calculated by the target-speed calculating portion 71. After the carriage 31 has reached the deceleration-start position, the PWM-signal generating portion 8 is supplied with the motor control signal in the form of the deceleration control signal generated by the deceleration control portion 73, so that the operating speed of the CR motor 35 is controlled to decelerate the carriage 31 until the movement of the carriage 31 is stopped.

Figure 5:
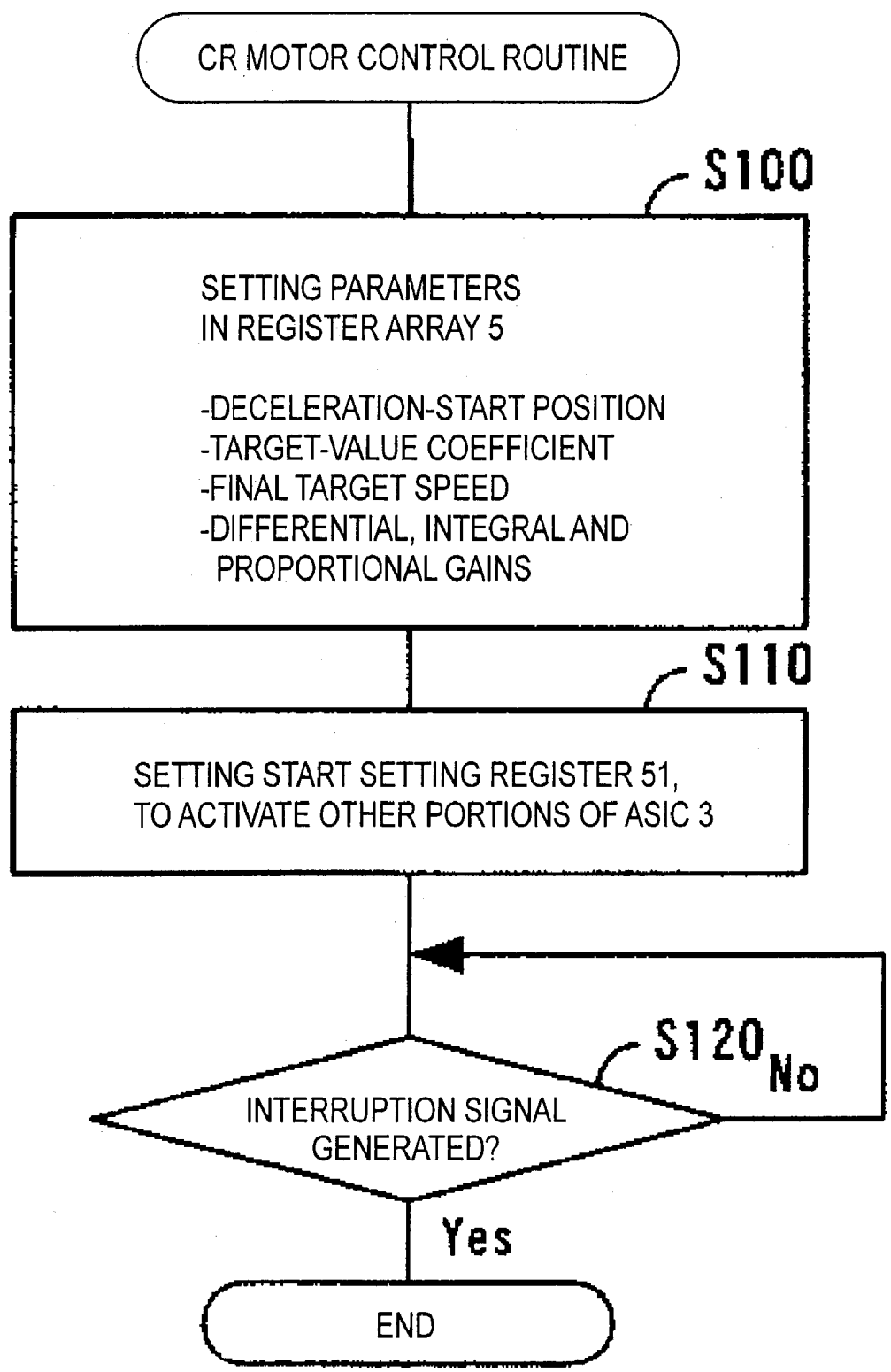
FIG. 5 is a flow chart illustrating a carriage motor control routine executed by a CPU of the carriage motor control apparatus of FIG. 3.

Referring next to the flow chart of FIG. 5, there will be described a CR motor control routine executed by the CPU 2 of the present carriage motor control apparatus 1.

The CR motor control routine is initiated with step S100 to set various parameters in the register array 5 of the ASIC 3, namely, the deceleration-start position in the deceleration-start position register 52, the target-value coefficient G in the target-value-coefficient register 53, the final target speed Vtg set in the final-target-speed-value register 54, and the differential gain Gd, integral gain Gi and proportional gain Gp in the gain register 55. Then, the control flow goes to step S110 to set the start setting register 51, for activating the other portions of the ASIC 3, so that the CR motor 35 is controlled according to the values set in the various registers, to move the carriage 31. When the carriage 31 has reached the deceleration-start position, the interruption signal is generated by the comparator-processor portion 62. Step S110 is followed by step S120 to determine whether the interruption signal has been generated. One cycle of execution of the present CR motor control routine is terminated upon generation of the interruption signal, that is, when an affirmative decision (YES) is obtained in step S120.

In the carriage motor control apparatus 1 discussed above, the transient target speed Vobj is set to be equal to (G×Vtg) lower than the final target speed Vtg, when the movement of the carriage 31 is initiated at the zero position (when the moving speed Vi is zero). As indicated above, the target-value coefficient G is larger than zero but smaller than 1. The operating speed of the CR motor 35 is controlled so that the moving speed Vi coincides with the transient target speed Vobj=G×Vtg. As the moving speed Vi of the carriage 31 is raised, the transient target speed Vobj is accordingly increased toward the final target speed Vtg, so that the moving speed Vi of the carriage 31 is eventually made equal to the final target value Vtg.

Thus, the present carriage motor control apparatus 1 is not arranged to use the final target speed Vtg upon initiation of the movement of the carriage 31, but is arranged to set the transient target speed Vobj on the basis of the final target speed Vtg, in order to prevent an abrupt rise of the operating speed of the CR motor 35. By selecting the target-value coefficient G to be an optimum value, the moving speed Vi of the carriage 31 can be smoothly raised to the final value Vtg, without an overshoot and a consequent vibration or oscillation, which would take place in the case where the moving speed Vi of the carriage 31 is controlled from the very beginning of the movement of the carriage 31 from the zero position, so as to follow or coincide with the final target speed Vtg.

Figure 7:
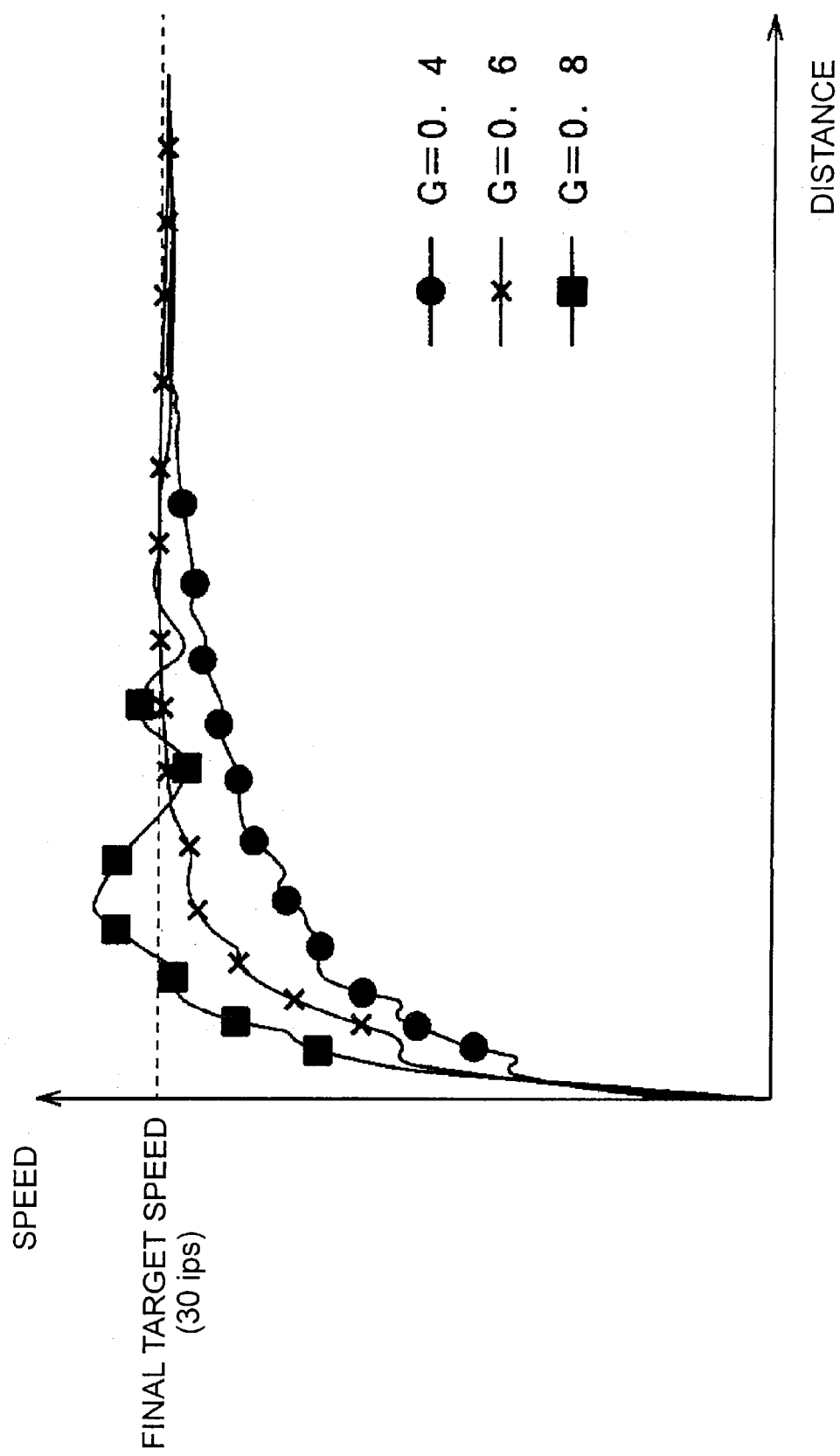
FIG. 7 is a view indicating a result of an experimentation conducted by the inventors.

Referring next to the graph of FIG. 7, there is indicated a result of an experimentation conducted by the present inventors.

In the printer used in the experimentation, the carriage 31 was accelerated in the accelerating region of 0.5 inch (about 12.7 mm), and the final target speed Vtg was set to be 30 ips (inch/second), that is, about 76.2 cm/second. In the experimentation, the carriage 31 was moved with different values of the target-value coefficient G set in the target-value-coefficient register 53, that is, with 0.4, 0.6 and 0.8. It will be understood from the graph of FIG. 7 that the moving speed Vi of the carriage 31 could be raised to the final target speed Vtg in a shorter time with the target-value coefficient G set at 0.6, than at 0.4, without an overshoot or vibration, which took place in a considerable amount when the coefficient G was set at 0.8. As is apparent from the result of the experimentation, it is possible to raise the moving speed Vi of the carriage 31 to the target value Vtg without the overshoot or vibration, by setting the target-value coefficient G at an optimum value in the target-value-coefficient register 53, on the basis of the desired moving characteristic of the carriage 31 and the gains (differential gain Gd, integral gain Gi and proportional gain Gp) used for the PID control. An experiment (a result of which is not shown in FIG. 7) conducted with the final target speed Vtg set at 15 ips, that is, about 38.1 cm/second showed that the target-value coefficient G was optimum at 0.4.

Thus, the optimum value of the target-value coefficient G varies with the final target speed Vtg and the other operating conditions of the CR motor 35. In view of this fact, different optimum values of the target-value coefficient G are stored in a suitable memory in the CPU 2, in relation to respective different combinations of the conditions, so that the optimum value of the coefficient G is automatically set in the target-value-coefficient register 53.

In the present carriage motor control apparatus 1, the above-indicated other operating conditions of the CR motor 35 include the amount of the ink accommodated in the printing head 30 carried by the carriage 31, and the coefficient of friction between the guide rod 34 and the carriage 31. A variation in the amount of the ink or the friction coefficient causes a variation in a relationship between the amount of control of the CR motor 35 and the moving speed Vi of the carriage 31. By selecting the suitable target-speed coefficient G depending upon these conditions, the operating speed of the CR motor 35 can be controlled so that the moving speed Vi of the carriage 31 coincides with the final target value Vtg at the printing-start position, without an overshoot of the moving speed Vi.

Accordingly, the CR motor 35 can be controlled to control the movement of the carriage 31 to permit the printing head 30 to effect printing at the nominal position, irrespective of a variation in the operating environment in which the carriage 31 is moved, whereby the printing performance of the printer can be significantly enhanced.

In the present embodiment, the CR motor 35 functions as a drive-force generator, while the linear encoder 39, period counter 63 and the speed calculating portion 64 cooperate to constitute a moving-speed detecting portion. It will also be understood that the feedback processing portion 72 constitutes a control-signal generating portion while the PWM-signal generating portion 8 and the CR-motor driver circuit 4 cooperate to constitute a drive-force controlling portion.

It will further be understood that the target-speed calculating portion 71 functions as a variably setting portion operable to repeatedly change or update the transient target speed Vobj, on the basis of the detected moving speed Vi and the final target speed Vtg, and that the target-value-coefficient register 53 functions as a programmable register for storing the target-value coefficient G.

While the first embodiment of this invention has been described above, this embodiment may be modified as needed.

In the first embodiment, the target-speed calculating portion 71 is arranged to calculate, change or update the transient target speed Vobj of the carriage 31 at a predetermined time interval. However, the target-speed calculating portion 71 may be modified to calculate the transient target speed Vobj each time the carriage 31 has been moved into alignment with each of the selected slits of the timing scale 38, after the movement of the carriage 31 is initiated. In this case, the register array 5 of the carriage motor control apparatus 1 includes a calculating-position register which stores values indicative of the positions of the above-indicated selected slits at which the transient target speed Vobj is calculated by the target-speed calculating portion 71. The comparator-processor portion 62 is arranged to compare the count "n" of the position counter 61 and each slit position set in the calculating-position register, for determining whether the carriage 31 has reached any one of the positions of the predetermined slits. The target-speed calculating portion 71 calculates the transient target speed Vobj when the comparator-processor 62 determines that the carriage 31 has reached one of the positions of the selected slits.

Alternatively, the target-speed calculating portion 71 may be arranged to calculate the transient target speed Vobj each time the carriage 31 has been moved by each of at least one predetermined distance. In this case, the carriage motor control apparatus 1 includes a moving-distance calculating portion operable to calculate a distance of movement of the carriage 31, on the basis of the clock signals and the moving speed Vi of the carriage 31 as calculated by the speed calculating portion 64. The target-speed calculating portion 71 calculates the transient target speed Vobj each time the distance of movement calculated by the moving-distance calculating portion has increased to the predetermined distance.

In the first embodiment, the target-speed calculating portion 71 is arranged to calculate the transient target speed Vobj in the accelerating region and the constant-speed region of the carriage 31. However, the target-speed calculating portion 71 may be modified to calculate the transient target speed Vobj in the accelerating region only. In this case, the register array 5 includes a printing-start-position register which stores a value indicative of the printing-start position. The comparator-processor portion 62 is arranged to compare the count "n" of the position counter 61 with the value set in the printing-start-position register, for determining whether the carriage 31 has reached the printing-start position. The calculating portion 71 sets the transient target speed Vobj to be equal to the final target value Vtg when the comparator-processor 62 determines that the carriage 31 has reached the printing-start position.

In the first embodiment, the coefficient G is a positive value smaller than 1. However, the coefficient may be set to be 1 or larger.

<Second Embodiment>

Referring to FIGS. 8–11, there will be described a carriage motor control apparatus 1a according to a second embodiment of this invention. The carriage motor control apparatus 1a, which includes a CPU 2a and an ASIC 3a, is different from the carriage motor control apparatus 1 of the first embodiment, only in the control routines executed by the CPU 2a and an arrangement of the ASIC 3a. The other elements of the second embodiment, which are denoted by the same reference numerals as used in the first embodiment, are identical with the corresponding elements of the first embodiment, and will not be described. The ASIC 3a includes a register array 5a, a carriage detecting portion 6a and a motor control portion 7a, which are different from the register array 5, carriage detecting portion 6 and motor control portion 7 of the ASIC 3 of the first embodiment, as described below.

Figure 8:
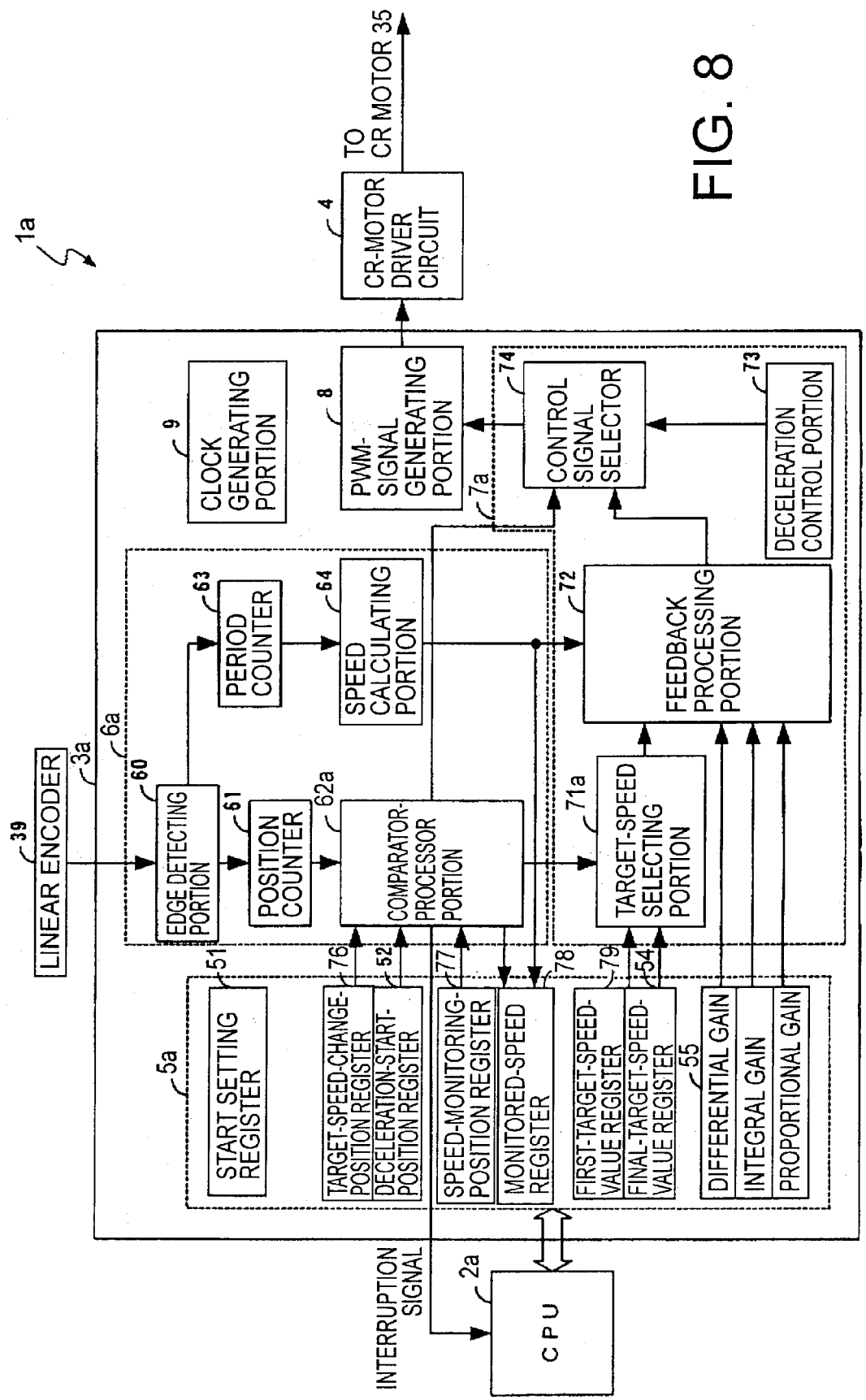
FIG. 8 is a block diagram showing an arrangement of a carriage motor control apparatus constructed according to a second embodiment of this invention.

As shown in FIG. 8, the register array 5a includes the start setting register 51, deceleration-start-position register 52, final-target-speed-value register 54 and gain register 55, as provided in the first embodiment, but does not include the target-value coefficient register 53. Instead, the register array 5a further includes a target-speed-change-position register 76, a speed-monitoring-position register 77, a monitored-speed register 78 and a first-target-speed-value register 79. The target-speed-change-position register 76 is provided to set a target-speed changing moment in the form of a target-speed change position at which a target speed used to control the moving speed of the carriage 31 is changed from a transient target speed value in the form of a first target speed value to a final target speed value. The speed-monitoring-position register 77 is provided to set a speed-monitoring moment in the form of a speed-monitoring position at which the moving speed of the carriage 31 is monitored in the accelerating region. The monitored-speed register 78 is provided to store the moving speed of the carriage 31 monitored at the speed-monitoring position. The first-target-speed-value register 79 is provided to set the first target speed value which is used as the transient target speed during a movement of the carriage 31 from the zero position to the target-speed-change position.

The carriage detecting portion 6a includes a comparator-processor portion 62a, which is arranged to compare the count "n" of the position counter 61 with each of the values set in the target-speed-change-position register 76, speed-monitoring-position register 77 and deceleration-start-position register 52, for determining whether the carriage 31 has reached each of the target-speed change position, the speed-monitoring position and the deceleration-start position.

When the comparator-processor portion 62a has determined that the carriage 31 has reached the target-speed-change position, the comparator-processor portion 62a generates a target-speed changing signal for changing the target speed from the first target speed value to the final target speed value. When the comparator-processor portion 62a has determined that the carriage has reached the speed-monitoring position, the comparator-processor portion 62a generates a speed storing signal for storing in the monitored-speed register 78 the moving speed of the carriage 31 calculated by the speed calculating portion 64. When the comparator-processor 62a has determined that the carriage 31 has reached the deceleration-start position, the comparator-processor portion 62a applies the interruption signal to the CPU 2a, as in the first embodiment of FIG. 3.

The motor control portion 7a includes a target-speed selecting portion 71a which is operable to select, as the target speed, the first target speed value set in the first-target-speed-value register 79, before the target-speed selecting portion 71a receives the target-speed changing signal from the comparator-processor portion 62a after the initiation of the movement of the carriage 31, and select the final target speed value set in the final-target-speed-value register 54, after the target-speed selecting portion 71a has received the target-speed changing signal from the comparator-processor portion 62a.

Accordingly, the target-speed selecting portion 71a supplies the feedback processing portion 72 with the first target speed value before the carriage 31 has reached the target-speed change position, and the final target speed value after the carriage 31 has reached the target-speed change position. When the carriage 31 has reached the speed-monitoring position, the moving speed of the carriage 31 calculated by the speed calculating portion 64 is stored in the monitored-speed register 78.

Then, a carriage motor control routine executed by the CPU 2a will be described, by reference to the flow chart of FIG. 9.

Figure 9:
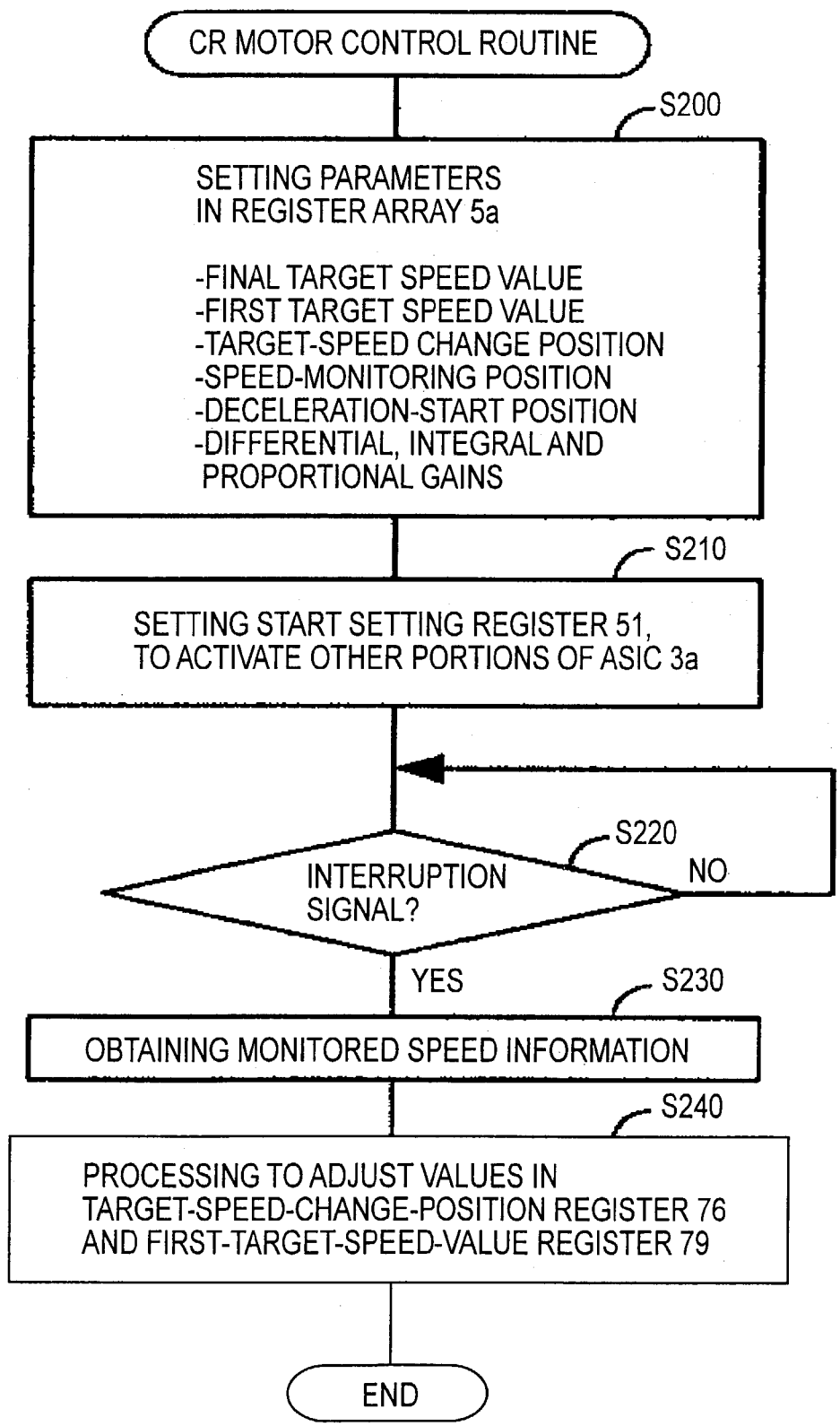
FIG. 9 is a flow chart illustrating a carriage motor control routine executed by a CPU of the carriage control apparatus of FIG. 8.

The carriage motor control routine of FIG. 9 is initiated with step S200 to set various parameters in the register array 5a of the ASIC 3a, while the carriage 31 is stopped at the zero position. Described more specifically, the deceleration-start position is set in the deceleration-start-position register 52, and the final target speed value is set in the final target-speed-value register 54. The differential, integral and proportional gains are set in the gain register 55, and the target-speed change position is set in the target-speed-change-position register 76. The speed-monitoring position is set in the speed-monitoring-position register 77, and the first target speed value is set in the first-target-speed-value register 79. Then, step S210 is implemented to set the start setting register 51, for activating the other portions of the ASIC 3a. The control flow then goes to step S220 to determine whether the interruption signal has been generated by the comparator-processor portion 62a. When an affirmative decision (YES) is obtained in step S220, the control flow goes to step S230 in which the CPU 2a reads out the monitored moving speed (monitored speed information) stored in the monitored-speed register 78. Step S230 is followed by step S240 to effect an adjusting routine for adjusting the target-speed-change position and the first target speed value which are respectively set in the target-speed-change-position register 76 and the first-target-speed-value register 79. Thus, one cycle of execution of the carriage motor control routine of FIG. 9 is terminated.

Figure 10:
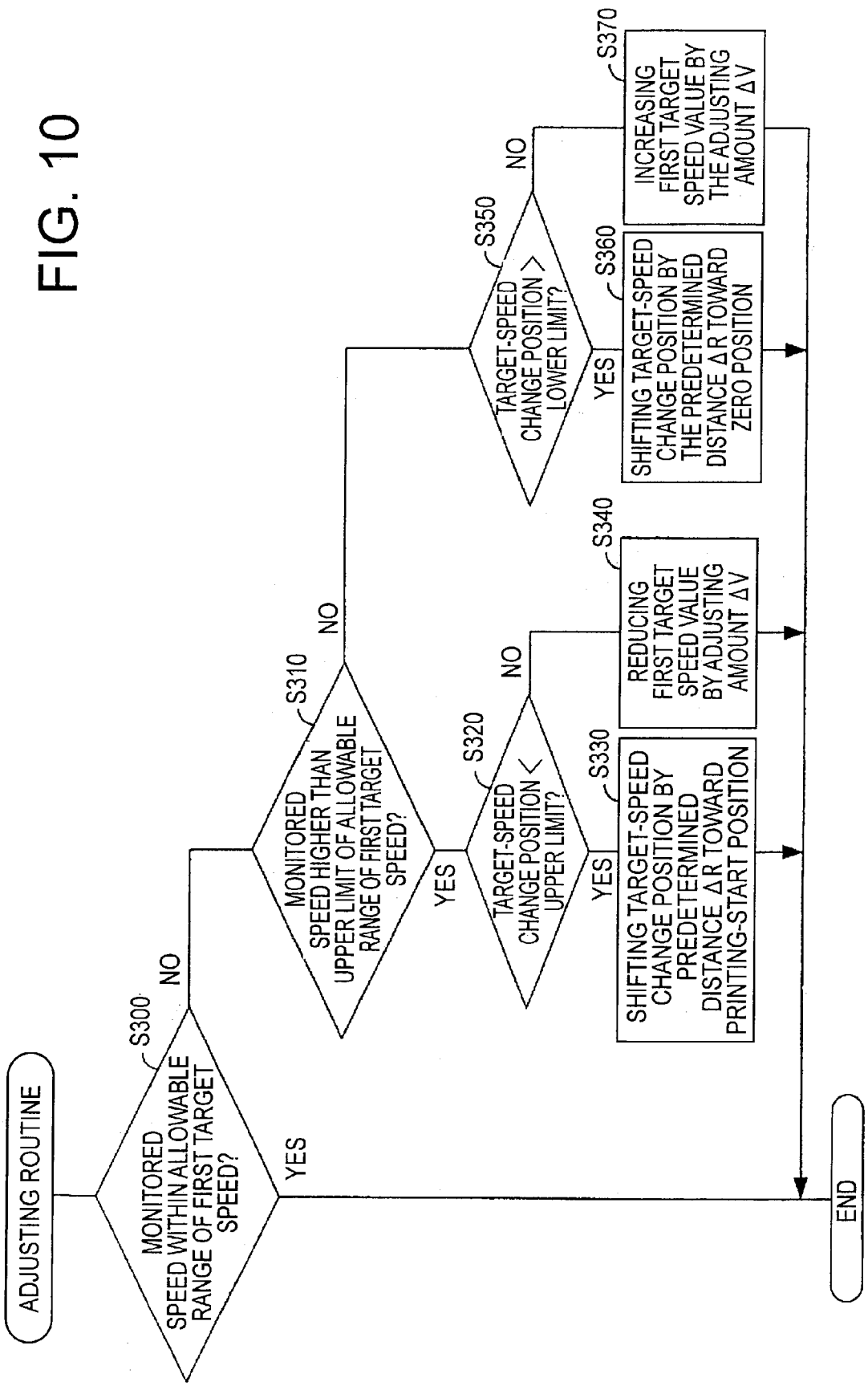
FIG. 10 is a flow chart illustrating an adjusting routine executed by the CPU of the carriage control apparatus of FIG. 8.

The adjusting routine executed in step S240 of the carriage motor control routine of FIG. 9 will be described by reference to the flow chart of FIG. 10.

The adjusting routine is initiated with step S300 to determine whether the moving speed of the carriage 31 monitored at the speed-monitoring position is within a predetermined allowable range of the first target speed value. If an affirmative decision (YES) is obtained in step S300, one cycle of execution of the present adjusting routine is terminated, without adjusting the first target speed value or the target-speed-change position.

If the monitored speed of the carriage 31 is not within the allowable range of the first target speed value, that is, if a negative decision (NO) is obtained in step S300, the control flow goes to step S310 to determine whether the monitored speed is higher than an upper limit of the allowable range of the first target speed value. If an affirmative decision (YES) is obtained in step S310, the control flow goes to step S320 to determine whether the value presently set in the target-speed-change-position register 76 is smaller than an upper limit of a predetermined range of the target-speed change position. If an affirmative decision (YES) is obtained in step S320, the control flow goes to step S330 in which the value set in the target-speed-change-position register 76 is increased to shift the target-speed change position toward the printing-start position by a predetermined adjusting distance ΔR. If the value presently set in the target-speed-change-position register 76 has increased to the upper limit of the allowable range of the target-speed change position, that is, if a negative decision (NO) is obtained in step S320, the control flow goes to step S340 in which the first target speed value set in the first-target-speed-value register 79 is reduced by a predetermined adjusting amount ΔV.

If the monitored speed of the carriage 31 is not higher than the upper limit of the allowable range of the first target speed value, that is, if a negative decision (NO) is obtained in step S310, the control flow goes to step S350 to determine whether the value presently set in the target-speed-change-position register 76 is larger than the upper limit of the target-speed change position. If an affirmative decision (YES) is obtained in step S350, the control flow goes to step S360 in which the value set in the target-speed-change-position register 76 is reduced to shift the target-speed change position toward the zero position by the predetermined adjusting distance ΔR. If the value presently set in the target-speed-change-position register 76 has decreased to the lower limit of the allowable range of the target-speed change position, that is, if a negative decision (NO) is obtained in step S350, the control flow goes to step S370 in which the first target speed value set in the first-target-speed-value register 79 is increased by the predetermined adjusting amount ΔV.

The allowable range of the first target speed is determined such that when the monitored moving speed of the carriage 31 is held within this allowable range, the moving speed can be raised to the final target speed value, without an overshoot, when the carriage 31 has reached the printing-start position.

Described more specifically, if the moving speed of the carriage 31 monitored at the speed-monitoring position is higher than the upper limit of the allowable range of the first target speed, as indicated in FIG. 11A, the CPU 2a of the present carriage motor control apparatus 1a changes the value set in the target-speed-change-position register 76, to shift the target-speed change position toward the printing-start position, by the predetermined adjusting distance ΔR, as indicated in FIG. 11B, so that the moment at which the target speed is changed from the first target speed value to the final target speed value is delayed, with a result of lowering the rate at which the moving speed of the carriage 31 is increased after an increase of the moving speed to the first target speed value.

If the moving speed of the carriage 31 monitored at the speed-monitoring position cannot be held within the allowable range even after the target-speed change position is eventually shifted to the upper limit of the allowable range by repeated shifting adjustments in respective cycles of control of the moving speed, the first target speed value is reduced by the predetermined adjusting amount ΔV, as indicated in FIG. 11C, with a result of lowering the rate at which the moving speed is increased to the first target speed value.

If the moving speed of the carriage 31 monitored at the speed-monitoring position is lower than the lower limit of the allowable range of the first target speed, the CPU 2a of the present carriage motor control apparatus 1a changes the value set in the target-speed-change-position register 76, to shift the target-speed change position toward the zero position, by the predetermined adjusting distance ΔR, so that the moment at which the target speed is changed from the first target speed value to the final target speed value is advanced, with a result of increasing the rate at which the moving speed of the carriage 31 is increased after an increase of the moving speed to the first target speed value.

If the moving speed of the carriage 31 monitored at the speed-monitoring position cannot be held within the allowable range even after the target-speed change position is eventually shifted to the lower limit of the allowable range as a result of repeated shifting adjustments in respective cycles of control of the moving speed, the first target speed value is increased by the predetermined adjusting amount ΔV, with a result of increasing the rate at which the moving speed is increased to the first target speed value.

It is noted that while the change of the moving speed of the carriage 31 is indicated in FIGS. 11A, 11B and 11C by combinations of straight segments, for the convenience of drawing, the moving speed is actually changed smoothly along a curve as a result of the PID control. It is also noted that the speed-monitoring position is kept unchanged at the value set in the speed-monitoring-position register 77.

In the carriage motor control apparatus 1a according to the present second embodiment of the invention described above in detail, the moving speed of the carriage 31 can be intricately controlled during its accelerating period or its movement in the accelerating region or period from the zero position to the printing-start position, so that the moving speed can be increased to the final target speed value, with high stability, without an overshoot, even if the relationship between the control amount of the CR motor 35 and the moving speed of the carriage 31 varies for some reason, for example, due to reduction of the amount of the ink accommodated in the printing head 30 carried by the carriage 31, or due to a change in the coefficient of friction between the guide rod 34 and the carriage 31.

Accordingly, the present carriage motor control apparatus 1a permits the printing head 30 to perform a printing operation at the nominal printing positions, and assures a significant improvement in the printing performance of the printer, irrespective of a change in the operating environment in which the carriage 31 is driven.

It will be understood from the foregoing description of the second embodiment that the CR motor 35 functions as a drive-force generator operable to generate a drive force to be applied to the carriage 31, and that the linear encoder 39, period counter 63 and speed calculating portion 64 cooperate to constitute a speed detecting or monitoring portion operable to detect or monitor the moving speed of the carriage 31. It will also be understood that the feedback processing portion 72 functions as a control-signal generating portion operable to generate a moving-speed control signal for controlling the moving speed of the carriage 31, and that the PWM-signal generating portion 8 and the CR-motor driver circuit 4 cooperate to constitute a drive-force control portion operable to control the drive-force generator in the form of the CR motor 35.

It will further be understood that the first-target-speed-value register 79 functions as a transient-target-speed-value supplying portion operable to supply the control-signal generating portion with a transient target speed value in the form of the first target speed value, while the final-target-speed-value register 54 functions as a final-target-speed-value supplying portion operable to supply the control-signal generating portion with the final target speed value. It will also be understood that the target-speed-change-position register 76, the comparator-processor portion 62a and the target-speed selecting portion 71a cooperate to constitute a target-speed changing portion operable to change the target speed from the first target speed value to the final target speed value.

It will further be understood that the speed-monitoring-position register 77, the comparator-processor portion 62a and the monitored-speed register 78 cooperate to constitute a moving-speed monitoring portion operable to monitor the moving speed of the carriage 31, while a portion of the CPU 2a assigned to implement steps S330, S340, S360 and S370 cooperate to constitute an adjusting portion operable to adjust a mode of control of the moving speed of the carriage 31.

It is also noted that a region between the zero position and the target-speed change position corresponds to a transient period between a moment of initiation of the movement of the carriage 31 and a moment at which the target speed is changed from the transient target speed value to the final target speed value, and that a region between the target-speed change position and the printing-start position corresponds to a final period between the moment at which the target speed is changed from the transient target speed value to the final target speed value and the moment at which the moving speed of the carriage coincides with the final target speed value. The accelerating period of the carriage 31 consists of the transient and final periods.

<Third Embodiment>

Referring to next FIGS. 12–15, there will be described a carriage motor control apparatus 1b according to a third embodiment of this invention. The carriage motor control apparatus 1b, which includes a CPU 2b and an ASIC 3b, is different from the carriage motor control apparatus 1a of the second embodiment, only in the control routines executed by the CPU 2b and an arrangement of the ASIC 3b. The other elements of the third embodiment, which are denoted by the same reference numerals as used in the second embodiment, are identical with the corresponding elements of the second embodiment, and will not be described. The ASIC 3b includes a register array 5b different from the register array 5a in the second embodiment, and a comparator-processor portion 62b and a target-speed-value selecting portion 71*b*, which are different from the comparator-processor portion 62*a* and target-speed selecting portion 71*a* of the second embodiment.

Figure 12:
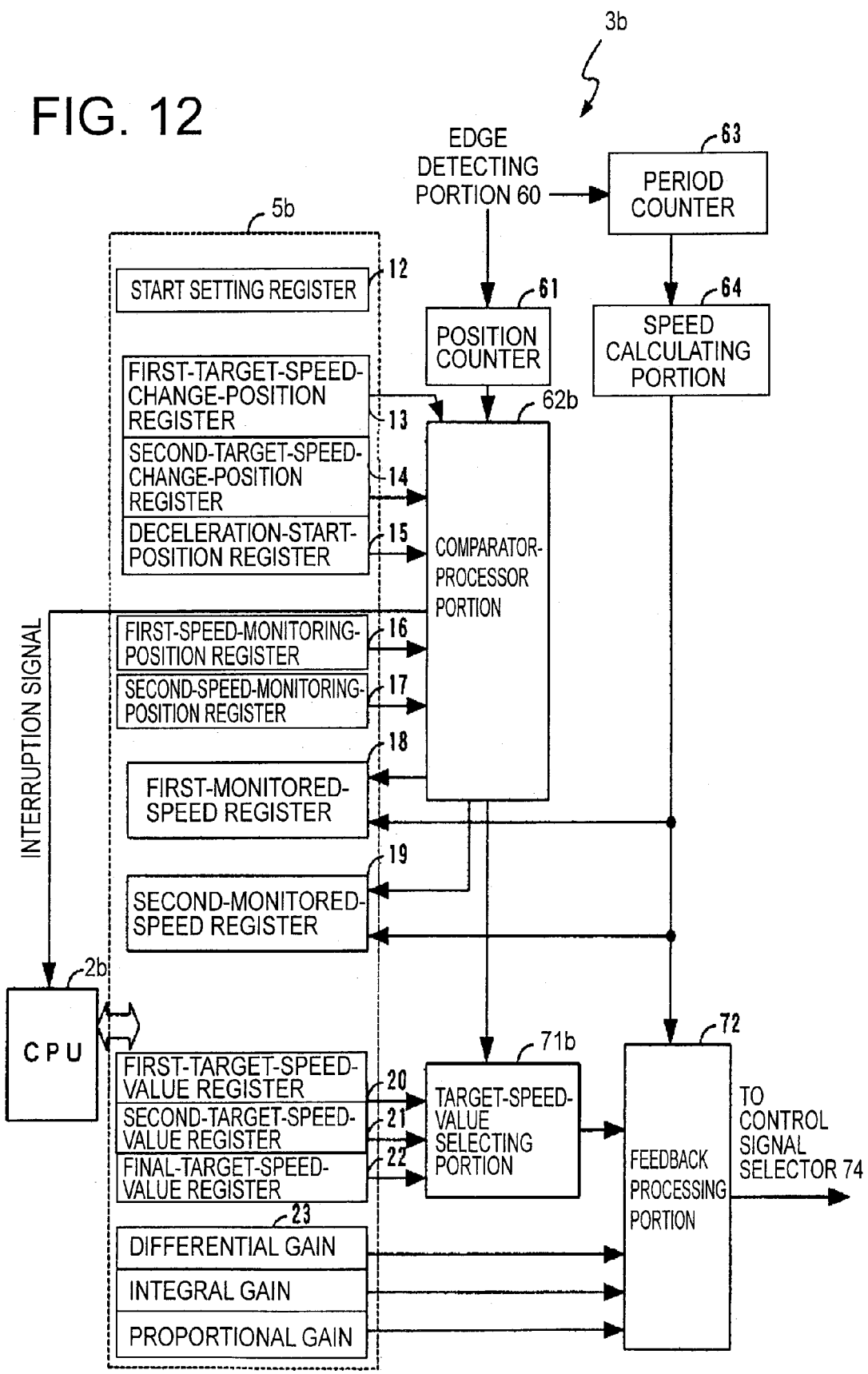
FIG. 12 is a block diagram showing a part of an ASIC of a carriage motor control apparatus constructed according to a third embodiment of the invention.

As shown in FIG. 12, the register array 5*b* includes; a start setting register 12 identical with the start setting register 51; a first-target-speed-change-position register 13; a second-target-speed-change-position register 14; a deceleration-start-position register 15 identical with the deceleration-start-position register 52; a first-speed-monitoring-position register 16; a second-speed-monitoring-position register 17; a first-monitored-speed register 18; a second-monitored-speed register 19; a first-target-speed-value register 20; a second-target-speed-value register 21; a final-target-speed-value register 22; and a gain register 23 identical with the gain register 55. The first-target-speed-change-position register 13 is provided to set a first target-speed changing moment in the form of a first target-speed change position at which the target speed used to control the moving speed of the carriage 31 is changed from a first transient target speed value to a second transient target speed value higher than the first transient target speed value. The second-target-speed-change-position register 14 is provided to set a second target-speed changing moment in the form of a second target-speed change position at which the target speed is changed from the second transient target speed value to a final target speed value. The first-speed-monitoring-position register 16 and the second-speed-monitoring-position register 17 are provided to set respective speed-monitoring moments in the form of first and second speed-monitoring positions at which the moving speed of the carriage 31 is monitored. The first-monitored-speed register 18 and the second-monitored-speed register 19 are provided to store respective first and second moving speeds of the carriage 31 monitored at the respective first and second speed-monitoring positions. The first-target-speed-value register 20 is provided to set the first transient target speed value used to control the moving speed of the carriage 31 during its movement from the zero position to the first target-speed change position, while the second-target-speed-value register 21 is provided to set the second transient target speed value used to control the moving speed of the carriage 31 during its movement from the first target-speed change position to the second target-speed change position. The final-target-speed-value register 22 is provided to set the final target speed value used to control the moving speed of the carriage 31 during its movement from the second target-speed change position to the printing-start position. The first and second transient target speed values will be hereinafter referred to simply as "first target speed value" and "second target speed value".

A carriage detecting portion 6*b* includes a comparator-processor portion 62*b*, which is arranged to compare the count "n" of the position counter 61 with each of the values set in the first-target-speed-change-position register 13, second-target-speed-change-position register 14, deceleration-start-position register 15, first-speed-monitoring-position register 16 and second-speed-monitoring-position register 17, for determining whether the carriage 31 has reached each of the first and second target-speed change positions, the deceleration-start position and the first and second speed-monitoring positions.

When the comparator-processor portion 62*b* has determined that the carriage 31 has reached the first or second target-speed-change position, the comparator-processor portion 62*b* generates a first target-speed changing signal for changing the target speed from the first target speed value to the second target speed value, or a second target-speed changing signal for changing the target speed from the second target speed value to the final target speed value, respectively. When the comparator-processor portion 62*b* has determined that the carriage has reached the first speed-monitoring position, the comparator-processor portion 62*b* generates a first speed storing signal for storing in the first-monitored-speed register 18 the moving speed of the carriage 31 calculated by the speed calculating portion 64. When the comparator-processor portion 62*b* has determined that the carriage has reached the second speed-monitoring position, the comparator-processor portion 62*b* generates a second speed storing signal for storing in the second-monitored-speed register 19 the moving speed of the carriage 31 calculated by the speed calculating portion 64. When the comparator-processor 62*b* has determined that the carriage 31 has reached the deceleration-start position, the comparator-processor portion 62*b* applies the interruption signal to the CPU 2*b*, as in the second embodiment of FIG. 8.

A motor control portion 7*b* includes the target-speed-value selecting portion 71*b* which is operable to select, as the target speed, the first target speed value set in the first-target-speed-value register 20, before the target-speed-value selecting portion 71*b* receives the first target-speed changing signal from the comparator-processor portion 62*b* after the initiation of the movement of the carriage 31, select the second target speed value set in the second-target-speed-value register 21, after the target-speed-value selecting portion 71*b* has received the first target-speed changing signal from the comparator-processor portion 62*b*, and select the final target speed value set in the final-target-speed-value register 22, after the target-speed-value selecting portion 71*b* has received the second target-speed changing signal from the comparator-processor portion 62*b*.

Accordingly, the target-speed-value selecting portion 71*b* supplies the feedback processing portion 72 with the first target speed value while the carriage 31 is moved from the zero position to the first target-speed change position, and supplies the feedback processing portion 72 with the second target speed value while the carriage 31 is moved from the first target-speed change position to the second target-speed change position. Further, the selecting portion 71*b* supplies the feedback processing portion 72 with the final target speed value while the carriage 31 is moved from the second target-speed change position to the printing-start position. The operating speed of the CR motor 35 is controlled such that the moving speed of the carriage 31 coincides with the target speed value (first, second or final target speed value) thus selected by the target-speed-value selecting portion 71*b*.

When the carriage 31 has reached the first and second speed-monitoring positions, the first and second moving speed values of the carriage 31 monitored at these speed-monitoring positions are stored in the respective first and second monitored-speed registers 18 and 19.

Then, a carriage motor control routine executed by the CPU 2*b* will be described, by reference to the flow chart of FIG. 13.

Figure 13:
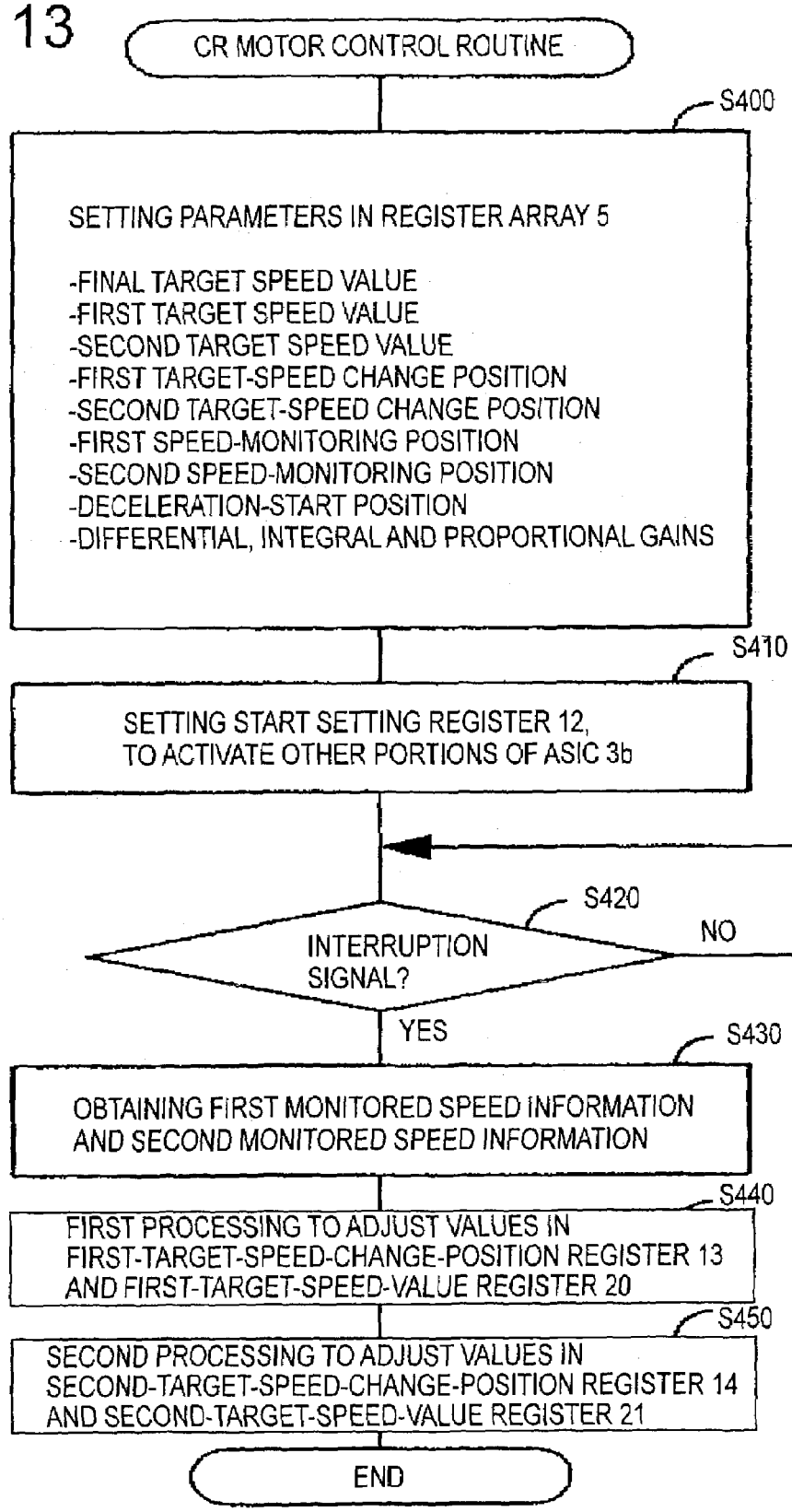
FIG. 13 is a flow chart illustrating a carriage motor control routine executed by a CPU of the carriage motor control apparatus of FIG. 12.

The carriage motor control routine of FIG. 13 is initiated with step S400 to set, in the register array 5*b* of the ASIC 3*b*, the following parameters: first and second target-speed change positions; deceleration-start position; first and second speed-monitoring positions; first and second target speed values; final target speed value; and differential, integral and proportional gains. Then, step S410 is implemented to set the start setting register 12, for activating the other portions of the ASIC 3*b*. The control flow then goes to step S420 to determine whether the interruption signal has been generated by the comparator-processor portion 62b. When an affirmative decision (YES) is obtained in step S420, the control flow goes to step S430 in which the CPU 2b reads out the first and second moving speed values (first and second monitored speed information) stored in the first- and second-monitored-speed registers 18 and 19. Step S430 is followed by step S440 to effect a first adjusting routine for adjusting the first target-speed change position and the first target speed value which are respectively set in the first target-speed-change-position register 13 and the first-target-speed-value register 20. Then, the control flow goes to step S450 to effect a second adjusting routine for adjusting the second target-speed change position and the second target speed value which are respectively set in the second target-speed-change-position register 14 and the second-target-speed-value register 21. Thus, one cycle of execution of the carriage motor control routine of FIG. 13 is terminated.

The first adjusting routine executed in step S440 of the carriage motor control routine of FIG. 13 will be described by reference to the flow chart of FIG. 14.

The first adjusting routine is initiated with step S500 to determine whether the moving speed of the carriage 31 monitored at the first speed-monitoring position is within a predetermined allowable range of the first target speed value. If an affirmative decision (YES) is obtained in step S500, one cycle of execution of the present first adjusting routine is terminated, without adjusting the first target speed value or the first target-speed change position.

If the first monitored speed of the carriage 31 is not within the allowable range of the first target speed value, that is, if a negative decision (NO) is obtained in step S500, the control flow goes to step S510 to determine whether the first monitored speed is higher than an upper limit of the allowable range of the first target speed value. If an affirmative decision (YES) is obtained in step S510, the control flow goes to step S520 to determine whether the value presently set in the first-target-speed-change-position register 13 is smaller than an upper limit of a predetermined range of the first target-speed change position. If an affirmative decision (YES) is obtained in step S520, the control flow goes to step S530 in which the value set in the first-target-speed-change-position register 13 is increased to shift the first target-speed change position toward the printing-start position by a predetermined adjusting distance ΔR. If the value presently set in the first-target-speed-change-position register 13 has increased to the upper limit of the allowable range of the first target-speed change position, that is, if a negative decision (NO) is obtained in step S520, the control flow goes to step S540 in which the first target speed value set in the first-target-speed-value register 20 is reduced by a predetermined adjusting amount ΔV.

If the first monitored speed of the carriage 31 is not higher than the upper limit of the allowable range of the first target speed value, that is, if a negative decision (NO) is obtained in step S510, the control flow goes to step S550 to determine whether the value presently set in the first-target-speed-change-position register 13 is larger than the upper limit of the first target-speed change position. If an affirmative decision (YES) is obtained in step S550, the control flow goes to step S560 in which the value set in the first-target-speed-change-position register 13 is reduced to shift the first target-speed change position toward the zero position by the predetermined adjusting distance ΔR. If the value presently set in the target-speed-change-position register 13 has decreased to the lower limit of the allowable range of the first target-speed change position, that is, if a negative decision (NO) is obtained in step S550, the control flow goes to step S570 in which the first target speed value set in the first-target-speed-value register 20 is increased by the predetermined adjusting amount ΔV.

Figure 14:
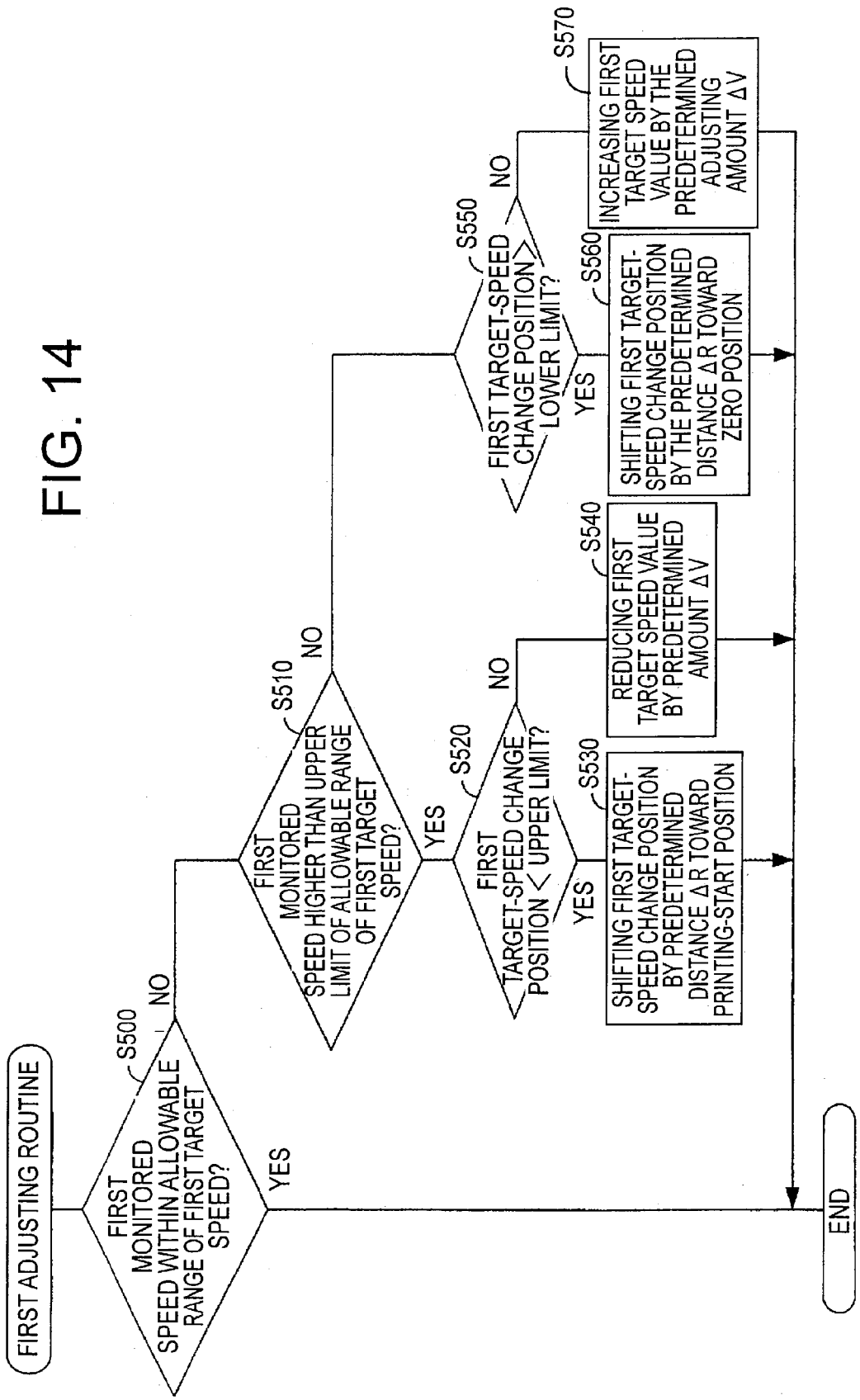
FIG. 14 is a flow chart illustrating a first adjusting routine executed by the CPU of the carriage motor control apparatus of FIG. 12.

The second adjusting routine executed in step S450 of FIG. 13 is the same as the first adjusting routine of FIG. 14, except in that the first-target-speed-change-position register 13, the first-target-speed-value register 20, the first monitored moving speed, the allowable range of the first target speed value and the allowable range of the first target-speed change position are replaced with the second-target-speed-change-position register 14, the second-target-speed-value register 21, the second monitored moving speed, the allowable range of the second target speed value and the allowable range of the second target-speed change position.

The allowable ranges of the first and second target speed values are determined such that when the first or second monitored moving speed of the carriage 31 is held within the corresponding allowable range, the moving speed can be raised to the final target speed value, without an overshoot, when the carriage 31 has reached the printing-start position.

Figure 15A:
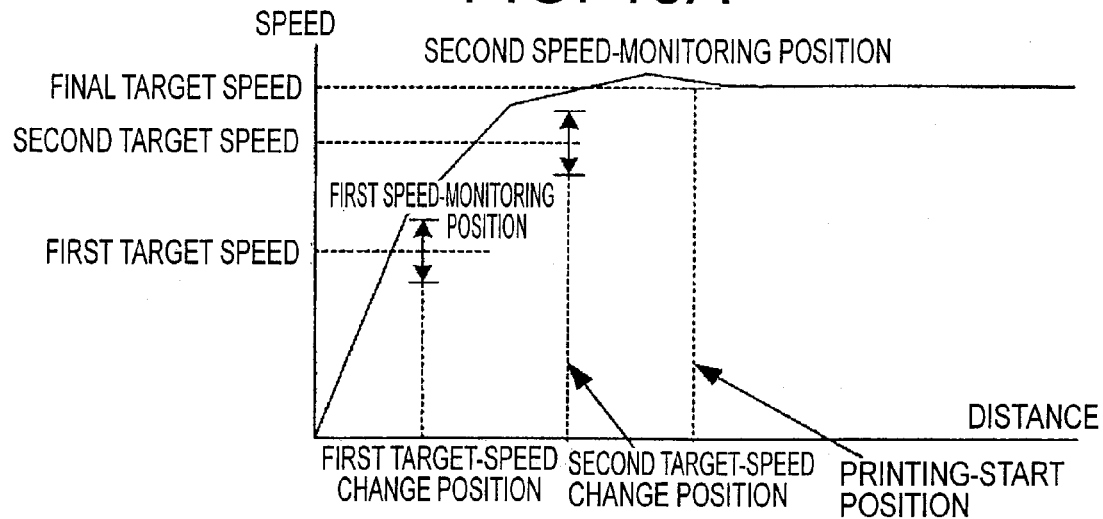
FIGS. 15A, 15B and 15C are views for explaining an example of an operation of the carriage motor control apparatus of FIG. 12 to control the speed of the carriage.
Figure 15B:
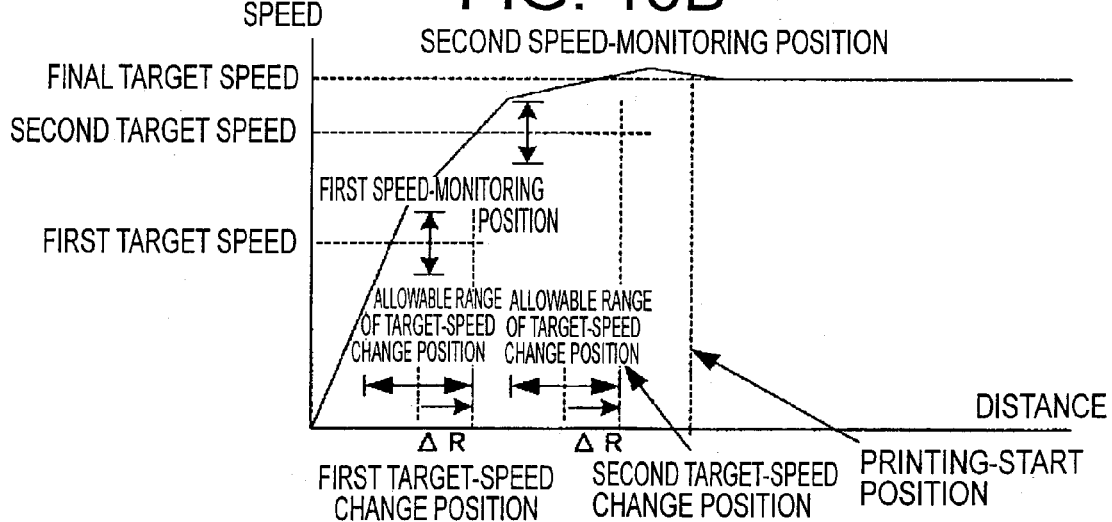

Described more specifically, if the first or second moving speed of the carriage 31 monitored at the first or second speed-monitoring position is higher than the upper limit of the allowable range of the corresponding first or second target speed value, as indicated in FIG. 15A, the CPU 2b of the present carriage motor control apparatus 1b changes the value set in the corresponding target-speed-change-position register 13, 14, to shift the first or second target-speed change position toward the printing-start position, by the predetermined adjusting distance ΔR, as indicated in FIG. 15B, so that the moment at which the target speed is changed from the first target speed value to the second target speed value or from the second target speed value to the final target speed value is delayed, with a result of lowering the rate at which the moving speed of the carriage 31 is increased after an increase of the moving speed to the first or second target speed value.

Figure 15C:
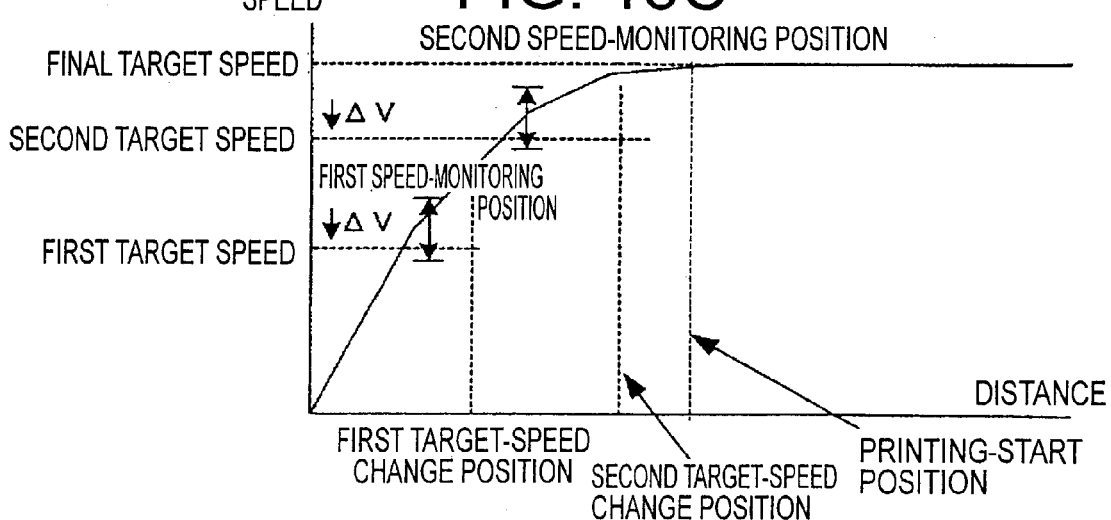

If the first or second moving speed of the carriage 31 monitored at the first or second speed-monitoring position cannot be held within the corresponding allowable range even after the first or second target-speed change position is eventually shifted to the upper limit of the allowable range as a result of repeated shifting adjustments, the first or second target speed value is reduced by the predetermined adjusting amount ΔV, as indicated in FIG. 15C, with a result of lowering the rate at which the moving speed is increased to the first or second target speed value.

If the first or second moving speed of the carriage 31 monitored at the first or second speed-monitoring position is lower than the lower limit of the, allowable range of the first or second target speed value, the CPU 2b of the present carriage motor control apparatus 1b changes the value set in the corresponding target-speed-change-position register 13, 14, to shift the first or second target-speed change position toward the zero position, by the predetermined adjusting distance ΔR, so that the moment at which the target speed is changed from the first target speed value to the second target speed value or from the second target speed value to the final target speed value is advanced, with a result of increasing the rate at which the moving speed of the carriage 31 is increased after an increase of the moving speed to the first or second target speed value.

If the moving speed of the carriage 31 monitored at the first or second speed-monitoring position cannot be held within the corresponding allowable range even after the first or second target-speed change position is eventually shifted to the lower limit of the allowable range as a result of repeated shifting adjustments, the first or second target speed value is increased by the predetermined adjusting amount $\Delta V$, with a result of increasing the rate at which the moving speed is increased to the first or second target speed value.

Where only one of the moving speeds monitored at the first and second speed-monitoring positions is not held within the corresponding allowable range, the corresponding target-speed change position or the corresponding first or second target speed value is adjusted so that the rate of increase of the moving speed of the carriage is adjusted to adjust the moving speed within the corresponding allowable range.

Like the graphs of FIGS. 11A–11C, the graphs of FIGS. 15A–15C use combinations of straight segments to show the change of the moving speed of the carriage 31, for the convenience of drawing. However, the moving speed is actually changed smoothly along a curve as a result of the PID control. It is also noted that the first and second speed-monitoring positions are kept unchanged at the values set in the first- and second-speed-monitoring-position registers 16, 17.

The carriage motor control apparatus 1b according to the present third embodiment of the invention described above in detail has substantially the same advantages as the second embodiment. Further, the present carriage motor control apparatus 1b uses the two target speed values used to control the moving speed of the carriage so as to eventually coincide with the final target speed value. The use of the two target speed values in addition toe the final target speed value permits a more intricate adjustment of the rate of change of the moving speed of the carriage 31, in the present carriage motor control apparatus 1b, than in the carriage motor control apparatus 1a of the second embodiment.

It will be understood from the foregoing description of the third embodiment that the feedback processing portion 72 functions as a control-signal generating portion operable to generate a moving-speed control signal for controlling the moving speed of the carriage 31, and that the first-target-speed-value register 20 and the second-target-speed-value register 21 cooperate to constitute a transient-target-speed-value supplying portion operable to supply the control-signal generating portion with the first and second transient target speed values, while the final-target-speed-value register 22 functions as a final-target-speed-value supplying portion operable to supply the control-signal generating portion with the final target speed value. It will also be understood that the first-target-speed-change-position register 13, the second-target-speed-change-position register 14, the comparator-processor portion 62b and the target-speed-value selecting portion 71b cooperate to constitute a target-speed changing portion operable to change the target speed from the first transient target speed value to the second transient target speed value or from the second transient target speed value to the final target speed value.

It will further be understood that the first-speed-monitoring-position register 16, the second-speed-monitoring-position register 17, the comparator-processor portion 62b, the first-monitored-speed register 18 and the second-monitored-speed register 19 cooperate to constitute a moving-speed monitoring portion operable to monitor the moving speed of the carriage 31, while a portion of the CPU 2b assigned to implement steps S530, S540, S560 and S570 cooperate to constitute an adjusting portion operable to adjust a mode of control of the moving speed of the carriage 31.

It is also noted that a region between the zero position and the first target-speed change position corresponds to a first period between a moment of initiation of the movement of the carriage 31 and a moment at which the target speed is changed from the first transient target speed value to the second transient target speed value, and that a region between the first and second target-speed change positions corresponds to a second period between the moment at which the target speed is changed from the first transient target speed value to the second transient target speed value and the moment at which the target speed is changed from the second transient target speed value to the final target speed value. It is further noted that a region between the second target-speed change position and the printing-start position corresponds to a third period between the moment at which the target speed is changed from the second transient target speed value to the final target speed value and the moment at which the moving speed of the carriage 31 coincides with the final target speed value. The accelerating period of the carriage 31 consists of the first, second and third periods. The first and second periods cooperate to constitute a transient period in which the first and second transient target speed values are used, while the third period is a final period in which the final target speed value is used.

<Fourth Embodiment>

Referring next to the block diagram of FIG. 16, there will be described a carriage motor control apparatus constructed according to a fourth embodiment of this invention. This apparatus is arranged to be operable in a selected one of three modes of operation. These three modes consist of a first mode in which the CR motor 35 is controlled to accelerate the carriage 31 in the same manner as in the first embodiment of FIGS. 1–7 (in particular, as shown in FIG. 6), a second mode in which the CR motor 35 is controlled to accelerate the carriage 31 in the same manner as in the second embodiment of FIGS. 8–11C (in particular, as shown in FIGS. 10 and 11A–11C), and a third mode in which the CR motor 35 is controlled to accelerate the carriage 31 in the same manner as in the third embodiment of FIGS. 12–15C (in particular, as shown in FIGS. 14 and 15A–15C).

The carriage motor control apparatus according to the fourth embodiment includes a CPU 2c, a register array 5c and an ASIC 3c. The register array 5c includes all of the registers provided in the third embodiment, and the target-value-coefficient register 53 as provided in the first embodiment. When the apparatus of the fourth embodiment is operated in the second mode, the first-target-speed-change-position register 13, the first-speed-monitoring-position register 16, the first-monitored-speed register 18 and the first-target-speed-value register 20 respectively function as the target-speed-change-position register 76, the speed-monitoring-position register 77, the monitored-speed register 78 and the first-target-speed-value register 79 which are provided in the second embodiment.

To permit the present carriage motor control apparatus to be operated in a desired one of the three modes, the register array 5c further includes an operation-mode register 24 in which operation mode data indicative of the desired or selected mode of operation of the apparatus are stored. The desired mode may be set by the operator of the apparatus. Further, the ASIC 3c includes a target-speed calculating/selecting portion 71c in place of the target-speed-value selecting portion 71b provided in the third embodiment. In the first mode of operation, the target-speed calculating/selecting portion 71c functions as the target-speed calculating portion 71 provided in the first embodiment. In the second mode, the target-speed calculating/selecting portion 71c functions as the target-speed selecting portion 71a provided in the second embodiment. In the third mode, the target-speed calculating/selecting portion 71c functions as the target-speed-value selecting portion 71b provided in the third embodiment.

In the fourth embodiment, the target-speed calculating/selecting portion 71c is operated according to the desired mode of operation set in the operation-mode register 24. Namely, the target-speed calculating/selecting portion 71c calculates the desired transient target speed value according to the above-indicated equation (1) when the first mode is selected, selects the transient target speed set in the first-target-speed-value register 20 when the second mode is selected, and sequentially selects the first and second transient target speed values respectively set in the first-target-speed-value register 20 and the second-target-speed-value register 21, when the third mode is selected. In the second mode, the adjusting routine illustrated in the flow chart of FIG. 10 is executed by the CPU 2c. In the third mode, the first adjusting routine illustrated in the flow chart of FIG. 14 and the second adjusting routine are executed by the CPU 2c.

Figure 16:
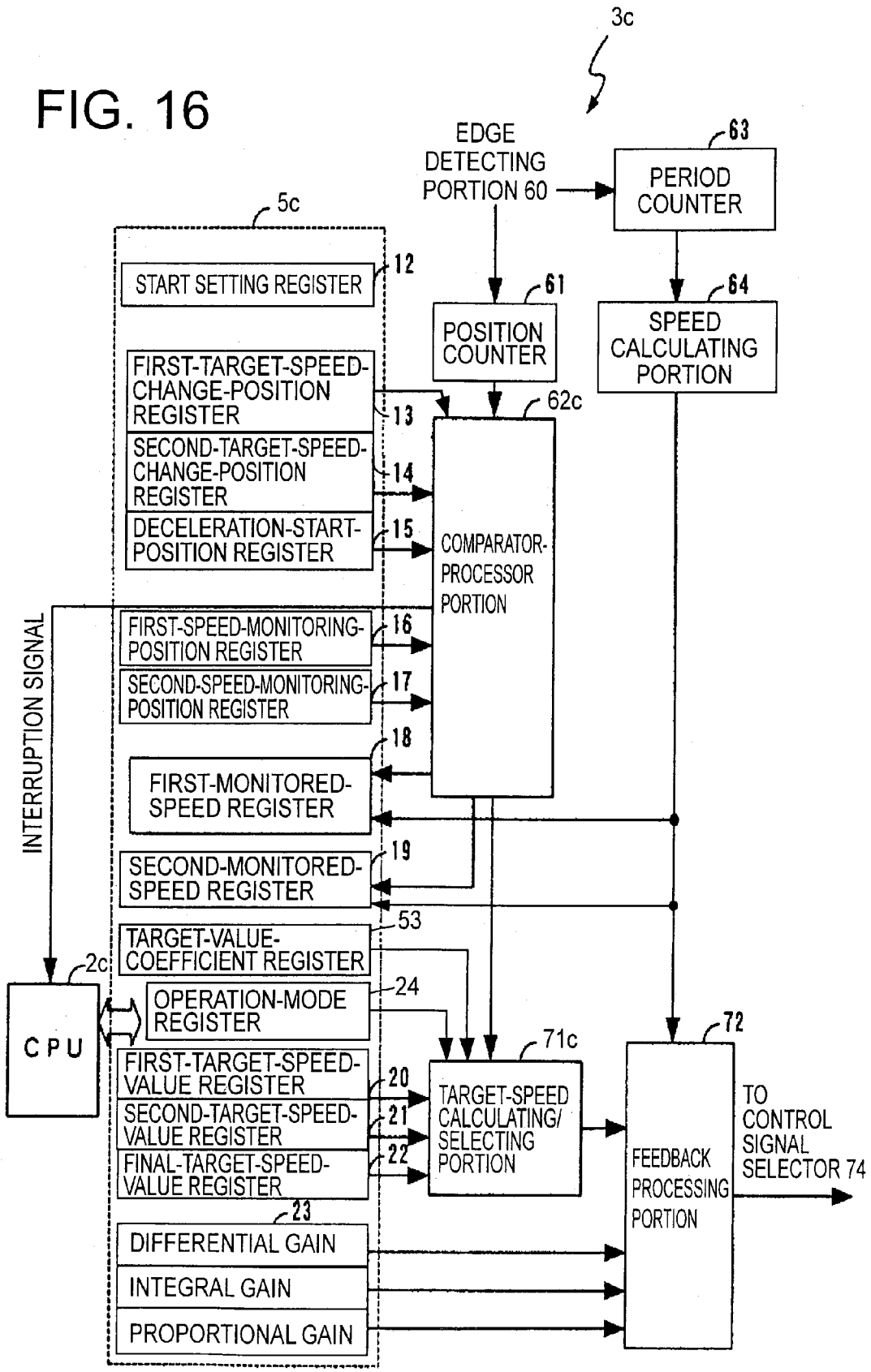
FIG. 16 is a block diagram showing a part of an ASIC of a carriage motor control apparatus constructed according to a fourth embodiment of the invention.

The carriage motor control apparatus according to the fourth embodiment of FIG. 16 may be commonly used for various types of printer which have different characteristics in terms of printing speed, quality of printed images, and control arrangements. Since the present apparatus is operable in a selected one of three modes of operation, the apparatus can be used for different types of printer, irrespective of their characteristics. Where the apparatus is used for a printer which is operated at a relatively high printing speed for relatively high printing efficiency, the apparatus is operated in the second and third modes, for instance. Where the apparatus is used for a printer which is operated at a relatively low printing speed for relatively high quality of the printed images, the apparatus is operated in the first mode in which the transient target speed is updated from time to time.

While the first through fourth preferred embodiments of this invention have been described above, it is to be understood that the invention is not limited to the details of the illustrated embodiments, but may be otherwise embodied.

The second, third and fourth embodiments use one transient target speed value or two transient target speed values, which is/are used to control the moving speed of the carriage 31 so as to be eventually coincide with the final target speed value. However, the carriage motor control apparatus may use three or more transient target speed values in addition to the final target speed value. In this case, the rate of change of the moving speed of the carriage 31 can be more intricately controlled, assuring a further improvement in the speed control accuracy.

In the second, third and fourth embodiments, the position of the carriage 31 detected on the basis of the counted number of the slits of the timing scale 38 is used to detect the timing at which the target speed is changed from the first target speed value to the second target speed value, and from the second target speed value to the final target speed value. However, a predetermined time or times after the moment of initiation of the movement of the carriage 31 may be used to detect the timing at which the target speed is changed. In this case, the position counter 61 of the ASIC 3a, 3b is replaced by a time counter arranged to measure the time which has passed after the moment of initiation of the carriage movement, by counting the clock signals.

Although the CR motor 35 provided in the illustrated embodiments is a DC motor, the electric motor to be controlled by the carriage motor control apparatus according to the present invention may be a stepping motor. In this case, the ASIC 3, 3a, 3b is provided with a pulse-generating circuit in place of the PWM-signal generating portion and CR-motor driver circuit 4. The pulse-generating circuits is arranged to apply to the stepping motor a pulse signal corresponding to the speed control signal generated by the feedback processing portion 72.

In the illustrated embodiments, the ASIC 3, 3a, 3b is used to calculate the moving speed and position of the carriage 31 and generate the PWM signal for controlling the operating speed of the CR motor 35. However, the ASIC 3, 3a, 3b may be replaced by a programmable logic device such as CPLD (Complex Programmable Logic Device) and FPGA (Field Programmable Gate Array).

While the illustrated embodiments are adapted to effect the PID control of the CR motor 35, the PID control may be of a pre-differentiation type or a pre-proportioning-and-differentiation type.

What is claimed is:

1. A method of feedback-controlling a moving speed of a moving body such that a detected moving speed of said moving body coincides with a predetermined target speed value, comprising the steps of:

changing a target speed of said moving body by sequentially establishing a plurality of target speed values including a final target speed value during one accelerated motion of said moving body, in at least an accelerating region between a zero position at which a movement of said moving body is initiated, and a predetermined position at which the detected moving speed should coincide with said final target speed value; and controlling the moving speed of the moving body such that said detected moving speed coincides with a presently established one of said plurality of target speed values.

2. A method according to claim 1, wherein said step of changing a target speed comprises sequentially establishing said plurality of target speed values such that the presently established target speed value gradually increases with a lapse of time after a moment at which the movement of said moving body is initiated.

3. A method according to claim 1, wherein said step of changing a target speed comprises variably setting a transient target speed (Vobj) of said moving body on the basis of said detected moving speed (Vi) and said final target speed value (Vtg) of said moving body, and said step of controlling the moving speed of the moving body comprises controlling said moving speed such that said detected moving speed coincides with said transient target speed.

4. A method according to claim 3, wherein said step of variably setting a transient target speed comprises a step of repeatedly updating said transient target speed at a predetermined timing.

5. A method according to claim 4, wherein said step of repeatedly updating said transient target speed at a predetermined timing comprises a step of updating said transient target speed when each of at least one predetermined time has passed after a moment of initiation of the movement of said moving body from said zero position.

6. A method according to claim 4, wherein said step of repeatedly updating said transient target speed at a predetermined timing comprises a step of updating said transient target speed when said moving body has reached each of at least one predetermined position.

7. A method according to claim 4, wherein said step of repeatedly updating said transient target speed at a predetermined timing comprises a step of updating said transient target speed when said moving body has moved by each of at least one predetermined distance.

8. A method according to claim 1, wherein said step of changing a target speed comprises setting at least one target-speed changing moment in an accelerating period between a first moment at which the movement of said moving body is initiated and a second moment at which the moving speed of the moving body should coincide with said final target speed value, and said step of controlling the moving speed of the moving body comprises controlling the moving speed of said moving body such that the detected moving speed coincides with at least one transient target speed value in a transient period between said first moment and a last one of said at least one target-speed changing moment, and such that the detected moving speed coincides with said final target speed value in a final period between said last one of said at least one target-speed changing moment and said second moment.

9. A method according to claim 8, further comprising the steps of:
   monitoring the moving speed of said moving body at each of at least one speed-monitoring moment;
   determining whether the moving speed of said moving body monitored at said each speed-monitoring moment is within a predetermined allowable range; and
   when the moving speed monitored at said each speed-monitoring moment is not within said predetermined allowable range, adjusting a mode of control of the moving speed of said moving body such that the moving speed monitored at said each speed-monitoring moment in a next cycle of control of the moving speed of the moving body will be held within said predetermined allowable range.

10. A method according to claim 9, wherein said at least one speed-monitoring moment corresponds to said at least one target-speed changing moment, and said step of adjusting a mode of control of the moving speed of said moving body comprises shifting each of at least one of said at least one target-speed changing moment when the moving speed monitored at the speed-monitoring moment corresponding to said each of said at least one of said at least one target-speed changing moment is not within said predetermined allowable range.

11. A method according to claim 9, wherein said at least one speed-monitoring moment corresponds to said at least one target-speed changing moment and said at least one transient target speed value, and said step of adjusting a mode of control of the moving speed of said moving body comprises changing each of at least one of said at least one transient target speed value which corresponds to each of at least one of said at least one target-speed changing moment, when the moving speed monitored at the speed-monitoring moment corresponding to said each of said at least one of said at least one target-speed changing moment is not within said predetermined allowable range.

12. A method according to claim 8, wherein said at least one target-speed changing moment consists of one target-speed changing moment, and said at least one transient target speed value consists of one transient target speed value, said step of controlling the moving speed of said moving body comprising controlling the moving speed such that said detected moving speed coincides with said one transient target speed value in the transient period between said first moment and said one target-speed changing moment, and such that the detected moving speed coincides with said final target speed value in the final period between said one target-speed changing moment and said second moment.

13. A method according to claim 8, wherein said at least one target-speed changing moment consists of a plurality of target-speed changing moments, and said at least one transient target speed value consists of a plurality of transient target speed values.

14. A method according to claim 13, wherein said plurality of target-speed changing moments consist of a first target-speed changing moment and a second target-speed changing moment, and said plurality of transient target speed values consist of a first transient target speed value and a second transient target speed value higher than said first transient target speed value, said step of controlling the moving speed of said moving body comprising controlling the moving speed such that said detected moving speed coincides with said first transient target speed value in a first portion of said transient period between said first moment and said first target-speed changing moment, such that the detected moving speed coincides with said second transient target speed value in a second portion of said transient period between said first and second target-speed changing moments, and such that the detected moving speed coincides with said final target speed value in the final period between said second target-speed changing moment and said second moment.

15. An apparatus for feedback-controlling a moving speed of a moving body, comprising:
   a target-speed changing portion operable to change a target speed of said moving body by sequentially establishing a plurality of target speed values including a final target speed value during one accelerated motion of said moving body, in at least an accelerating region between a zero position at which a movement of said moving body is initiated, and a predetermined position at which the detected moving speed should coincide with said final target speed value; and
   a moving-speed controlling portion operable to control the moving speed of the moving body such that said detected moving speed coincides with a presently established one of said plurality of target speed values.

16. A method according to claim 1, wherein said moving body comprises a carriage of a print head in a printer, which should be driven at a constant speed in a constant-speed region following said accelerating region, during said constant-speed region a printing operation being performed.

17. An apparatus according to claim 15, wherein said target-speed changing portion sequentially establishes said plurality of target speed values such that the presently established target speed value gradually increases with a lapse of time after a moment at which the movement of said moving body is initiated.

18. An apparatus according to claim 15, further comprising:
   a drive-force generator operable to generate a drive force to be applied to said moving body;
   a moving-speed detecting portion operable to detect the moving speed of said moving body; and
   a drive-force controlling portion operable to control said drive-force generator according to a moving-speed control signal,
   and wherein said moving-speed controlling portion includes a control-signal generating portion operable to generate said moving-speed control signal for controlling the moving speed of the moving body such that the moving speed detected by said moving-speed detecting portion coincides with a transient target speed, and said target-speed changing portion includes a variably setting portion operable to variably set said transient target speed (Vobj) on the basis of said moving speed (Vi) detected by said moving-speed detecting portion and said final target speed value (Vtg).

19. An apparatus according to claim 18, wherein said variably setting portion repeatedly updates said transient target speed at a predetermined timing.

20. An apparatus according to claim 19, wherein said variably setting portion repeatedly updates said transient target speed when each of at least one predetermined time has passed after a moment of initiation of the movement of said moving body from said zero position.

21. An apparatus according to claim 19, wherein said variably setting portion repeatedly updates said transient target speed when said moving body has reached each of at least one predetermined position.

22. An apparatus according to claim 19, wherein said variably setting portion repeatedly updates said transient target speed when said moving body has moved by each of at least one predetermined distance.

23. An apparatus according to claim 18, wherein said variably setting portion determines said transient target speed to be lower than said final target speed.

24. An apparatus according to claim 18, wherein said variably setting portion obtains said transient target speed (Vobj) according to an equation, Vobj=(Vtg−Vi)×G+Vi, wherein "G" represents a coefficient.

25. An apparatus according to claim 24, wherein said coefficient (G) is larger than zero and smaller than one.

26. An apparatus according to claim 24, further comprising a programmable register which stores said coefficient and which is externally accessible to change a value of said coefficient, and wherein said variably setting portion is connected to said register to receive said coefficient used to obtain said transient target speed.

27. An apparatus according to claim 18, wherein said control-signal generating portion generates said moving-speed control signal by PD control processing of said moving speed detected by said moving-speed detecting portion and said transient target speed updated by said variably setting portion.

28. An apparatus according to claim 18, wherein said drive-force generator is a converter operable to convert an electric energy into said drive force.

29. An apparatus according to claim 28, wherein said converter is an electric motor.

30. An apparatus according to claim 15, wherein said moving-speed controlling portion includes a control-signal generating portion operable to generate a moving-speed control signal for controlling the moving speed of the moving body, said apparatus further comprising:
  a drive-force generator operable to generate a drive force to be applied to said moving body;
  a moving-speed detecting portion operable to detect the moving speed of the moving body;
  a drive-force controlling portion operable to control said drive-force generator according to said moving-speed control signal generated by said control-signal generating portion;
  a transient-target-speed-value supplying portion operable to supply said control-signal generating portion with at least one transient target speed value; and
  a final-target-speed-value supplying portion operable to supply said control-signal generating portion with said final target speed value,
  and wherein said target-speed changing portion is operable to set at least one target-speed changing moment in an accelerating period between a first moment at which the movement of said moving body is initiated and a second moment at which the moving speed of the moving body should coincide with said final target speed value, said target-speed changing portion operating said transient-target-speed-value supplying portion to supply said control-signal generating portion with said at least one transient target speed value in a transient period between said first moment and a last one of said at least one target-speed changing moment, and operating said final-target-speed-value supplying portion to supply said control-signal generating portion with said final target speed value in a final period between said last one of said at least one target-speed changing moment and said second moment.

31. An apparatus according to claim 30, further comprising:
  a moving-speed monitoring portion operable to monitor the moving speed of said moving body at each of at least one speed-monitoring moment; and
  an adjusting portion operable when the moving speed of said moving body monitored at said each speed-monitoring moment is not within a predetermined allowable range, said adjusting portion adjusting a mode of control of the moving speed of said moving body such that the moving speed monitored at said each speed-monitoring moment in a next cycle of control of the moving speed of the moving body will be held within said predetermined allowable range.

32. An apparatus according to claim 31, wherein said at least one speed-monitoring moment corresponds to said at least one target-speed changing moment, and said adjusting portion is operable to shift each of at least one of said at least one target-speed changing moment when the moving speed monitored at the speed-monitoring moment corresponding to said each of said at least one of said at least one target-speed changing moment is not within said predetermined allowable range.

33. An apparatus according to claim 31, wherein said at least one speed-monitoring moment corresponds to said at least one target-speed changing moment and said at least one transient target speed value, and said adjusting portion is operable to change each of at least one of said at least one transient target speed value which corresponds to each of at least one of said at least one target-speed changing moment, when the moving speed monitored at the speed-monitoring moment corresponding to said each of said at least one of said at least one target-speed changing moment is not within said predetermined allowable range.

34. An apparatus according to claim 30, wherein said transient-target-speed-value supplying portion is operable to supply said control-signal generating portion with one transient target speed value, and said target-speed changing portion is operable to set one target-speed changing moment in said accelerating period, said target-speed changing portion operating said transient-target-speed-value supplying portion to supply said control-signal generating portion with said one transient target speed value in said transient period between said first moment and said one target-speed changing moment, and operating said final-target-speed-value supplying portion to supply said control-signal generating portion with said final target speed value in said final period between said one target-speed changing moment and said second moment.

35. An apparatus according to claim 30, wherein said transient-target-speed-value supplying portion is operable to supply said control-signal generating portion with a plurality of transient target speed values, and said target-speed changing portion is operable to set a plurality of target-speed changing moments in said accelerating period, and operate said transient-target-speed-value supplying portion to supply said control-signal generating portion with said plurality of transient target speed values at said plurality of target-speed changing moments.

36. An apparatus according to claim 35, wherein said transient-target-speed-value supplying portion is operable to supply said control-signal generating portion with a first transient target speed value and a second transient target speed value higher than said first transient target speed value, and said target-speed changing portion is operable to set a first target-speed changing moment and a second target-speed changing moment in said accelerating period, said target-speed changing portion being operable to operate said transient-target-speed-value supplying portion to supply said control-signal generating portion with said first transient target speed value in a first portion of said transient period between said first moment and said first target-speed changing moment, and said second transient target speed value in a second portion of said transient period between said first and second target-speed changing moments, said target-speed changing portion being further operable to operate said final-target-speed-value supplying portion to supply said control-signal generating portion with said final target speed value in said final period between said second target-speed changing moment and said second moment.

37. An apparatus according to claim 35, further comprising:
a moving-speed monitoring portion operable to monitor the moving speed of said moving body at each of a plurality of speed-monitoring moments corresponding to said plurality of target-speed changing moments; and
an adjusting portion operable when the moving speed of said moving body monitored at each of said plurality of target-speed monitoring moments is not within a predetermined allowable range, said adjusting portion shifting each of at least one of said plurality of target-speed changing moments, when the moving speed monitored at the speed-monitoring moment corresponding to said each of said at least one of said plurality of target-speed changing moments is not within a predetermined allowable range.

38. An apparatus according to claim 30, wherein said transient-target-speed-value supplying portion is operable to supply said control-signal generating portion with said at least one transient target speed value such that each of said at least one transient target speed value is lower than said final target speed value.

39. An apparatus according to claim 30, wherein said control-signal generating portion generates said moving-speed control signal by proportional, integral and differential calculating operations performed with respect to the moving speed of said moving body detected by said moving-speed detecting portion and one of said at least one transient target speed value and said final target speed value.

40. An apparatus according to claim 30, wherein said drive-force generator is a converter operable to convert an electric energy into said drive force.

41. An apparatus according to claim 40, wherein said converter is an electric motor.

42. An apparatus according to claim 15, wherein said moving body comprises a carriage of a print head in a printer, which should be driven at a constant speed in a constant-speed region following said accelerating region, during said constant-speed region a printing operation being performed.

* * * * *